(12) United States Patent
Li et al.

(10) Patent No.: US 11,116,039 B2
(45) Date of Patent: Sep. 7, 2021

(54) METHOD AND APPARATUS FOR SUPPORTING USER'S MOBILITY OVER A LOCAL AREA DATA NETWORK

(71) Applicant: HUAWEI TECHNOLOGIES CO., LTD., Guangdong (CN)

(72) Inventors: Yongcui Li, Beijing (CN); Hui Ni, Beijing (CN); Yan Li, Beijing (CN)

(73) Assignee: Huawei Technologies Co., Ltd., Guangdong (CN)

( * ) Notice: Subject to any disclaimer, the term of this patent is extended or adjusted under 35 U.S.C. 154(b) by 0 days.

(21) Appl. No.: 16/376,957

(22) Filed: Apr. 5, 2019

(65) Prior Publication Data
US 2019/0239280 A1 Aug. 1, 2019

Related U.S. Application Data

(63) Continuation of application No. PCT/CN2017/083586, filed on May 9, 2017.

(51) Int. Cl.
*H04W 80/10* (2009.01)
*H04W 80/02* (2009.01)
(Continued)

(52) U.S. Cl.
CPC ............ *H04W 80/10* (2013.01); *H04W 8/08* (2013.01); *H04W 28/06* (2013.01);
(Continued)

(58) Field of Classification Search
CPC ..... H04W 60/04; H04W 80/10; H04W 76/25; H04W 76/20; H04W 6/0011; H04W 8/08;
(Continued)

(56) References Cited

U.S. PATENT DOCUMENTS

2011/0235546 A1 9/2011 Horn et al.
2011/0243003 A1* 10/2011 Oguchi ................. H04W 76/19
370/252
(Continued)

FOREIGN PATENT DOCUMENTS

CN 101163264 A 4/2008
CN 101453722 A 6/2009
(Continued)

OTHER PUBLICATIONS

Kim et al (U.S. Appl. No. 62/474,055), filed Mar. 20, 2017.*
(Continued)

*Primary Examiner* — Ian N Moore
*Assistant Examiner* — Sun Jong Kim
(74) *Attorney, Agent, or Firm* — Fish & Richardson P.C.

(57) ABSTRACT

A session management method and a session management function network element are provided. The session management method includes: learning, by a session management function SMF network element, of whether a first condition is met, where the first condition includes: a first location of user equipment UE is outside a service area SA of a local area data network LADN; and in response to determining that the first condition is met, stopping, by the SMF network element, data transmission of an LADN packet data unit PDU session of the LADN, and maintaining, by the SMF network element, a resource of the LADN PDU session.

15 Claims, 8 Drawing Sheets

(51) Int. Cl.
*H04W 76/25* (2018.01)
*H04W 36/00* (2009.01)
*H04W 8/08* (2009.01)
*H04W 28/06* (2009.01)
*H04W 64/00* (2009.01)
*H04W 68/00* (2009.01)
*H04W 72/04* (2009.01)
*H04W 88/18* (2009.01)
*H04W 8/06* (2009.01)

(52) U.S. Cl.
CPC ...... *H04W 36/0011* (2013.01); *H04W 64/003* (2013.01); *H04W 68/005* (2013.01); *H04W 72/0493* (2013.01); *H04W 76/25* (2018.02); *H04W 80/02* (2013.01); *H04W 88/184* (2013.01); *H04W 8/065* (2013.01); *H04W 68/00* (2013.01)

(58) Field of Classification Search
CPC ............. H04W 36/32; H04W 36/0011; H04W 36/0022; H04W 68/005; H04W 76/34; H04W 76/19; H04W 64/00
See application file for complete search history.

(56) References Cited

U.S. PATENT DOCUMENTS

| | | | |
|---|---|---|---|
| 2012/0246311 A1 | 9/2012 | Kagitani | |
| 2015/0350874 A1* | 12/2015 | Draznin | H04W 60/00 455/432.1 |
| 2018/0270896 A1* | 9/2018 | Faccin | H04W 48/08 |
| 2019/0166647 A1* | 5/2019 | Velev | H04W 76/11 |
| 2019/0182788 A1* | 6/2019 | Lee | H04W 80/10 |
| 2019/0200264 A1* | 6/2019 | Kim | H04W 60/04 |

FOREIGN PATENT DOCUMENTS

| | | |
|---|---|---|
| CN | 102640525 A | 8/2012 |
| CN | 102713877 A | 10/2012 |
| CN | 103945480 A | 7/2014 |
| WO | 2012114073 A1 | 8/2012 |

OTHER PUBLICATIONS

Faccin et al (U.S. Appl. No. 62/473,795), filed Mar. 20, 2017.*
TS 23.502—Update 4.2.2.2 General Registration, 3GPP SA WG2 Meeting #S2-121, S2-173269, May 15-19, 2017, Hangzhou, China (publically available on May 8, 2017 and was retrieved from the internet: URL: https://www.3gpp.org/ftp/tsg_sa/WG2_Arch/TSGS2_121_Hangzhou/Docs). (Year: 2017).*
LG Electronics, "SSC mode and UE mobility," 3GPP TSG SA WG2 #118bis, 3GPP, Spokane, WA, USA, S2-170238, Jan. 16-20, 2017, 6 pages.
Samsung, "TS 23.501: Buffering of downlink data," 3GPP TSG SA WG2 #119, Dubrovnik, Croatia, S2-171025, Feb. 13-17, 2017, 4 pages.
Huawei et al., "TS 23.501: Service area of CN NF," 3GPP TSG SA WG2 #120, Busan, Korea, S2-171871, Mar. 27-31, 2017, 7 pages.
Samsung, "Which network function takes responsible for mobility pattern," 3GPP TSG SA WG2 #118bis, Spokane, WA, USA, S2-170255, Jan. 16-20, 2017, 6 pages.
Office Action issued in Japanese Application No. 2018-566,500 dated Sep. 17, 2019, 8 pages. (With English Translation).
Office Action issued in Korean Application No. 2018-7035547 dated Jan. 15, 2020, 8 pages (with English translation).
Samsung et al., "TS 23.502—Update 4.3.2 PDU Session establishment for LADN," SA WG2 Meeting #S2-121, S2-172939, Hangzhou, China, May 15-19, 2017, 6 pages.
Office Action issued in Chinese Application No. 201780003292.6 dated Feb. 3, 2020, 16 pages.
Extended European Search Report issued in European Application No. 17909624.3 dated Jun. 26, 2019, 9 pages.
S2-172940—Samsung, "Discussion for LADN design considerations," SA WG2 Meeting #S2-121, Hangzhou, China, May 15-19, 2017, 3 pages.
S2-173269—Samsung, "TS 23.502—Update 4.2.2.2 General Registration," SA WG2 Meeting #52-121, Hangzhou, China, May 15-19, 2017, 6 pages.
S2-172872 Samsung,"Session management in a mobility restriction area",SA WG2 Meeting #120,Mar. 27-31, 2017, Busan, Korea(e-mail revision 3 of S2-172841),total 5 pages.
3GPP TS 23.501 V0.4.0 (Apr. 2017),3rd Generation Partnership Project;Technical Specification Group Services and System Aspects;System Architecture for the 5G System;Stage 2(Release 15),total 124 pages.
International Search Report and Written Opinion issued in International Application No. PCT/CN2017/083586 dated Jan. 5, 2018, 16 pages.

* cited by examiner

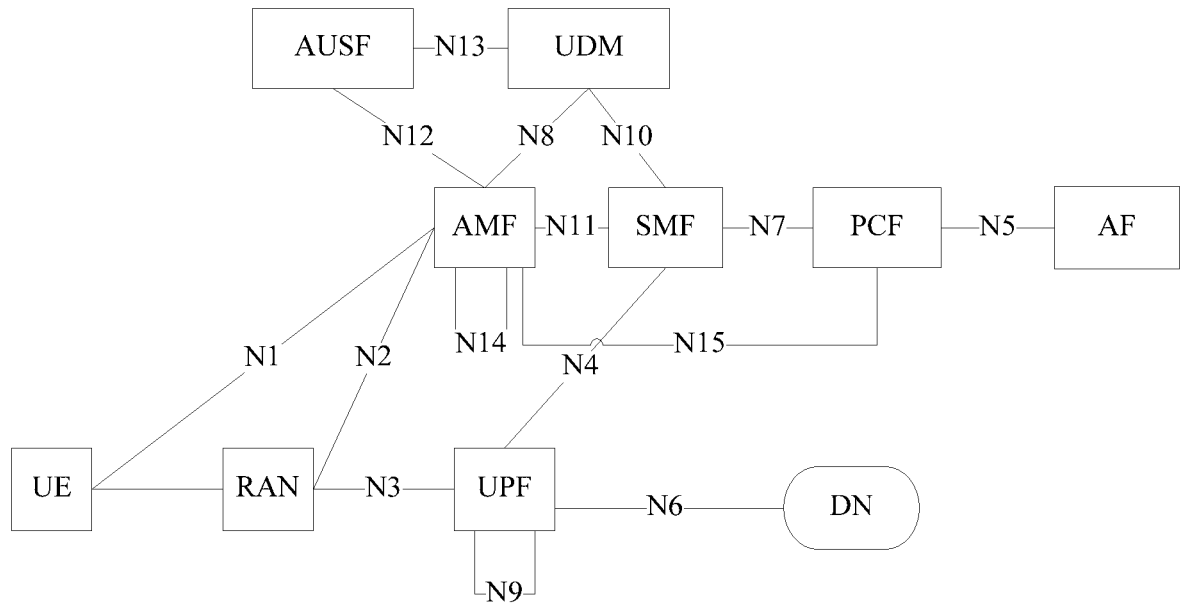
FIG. 1-a
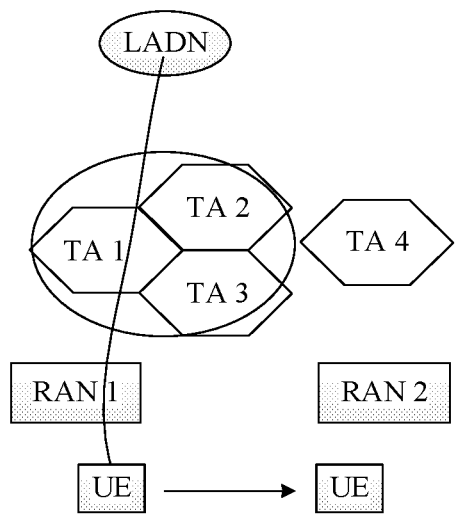
FIG. 1-b

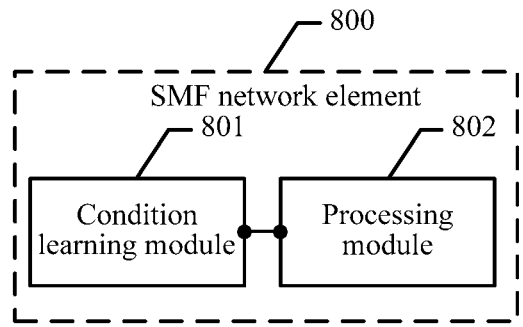
FIG. 8-a
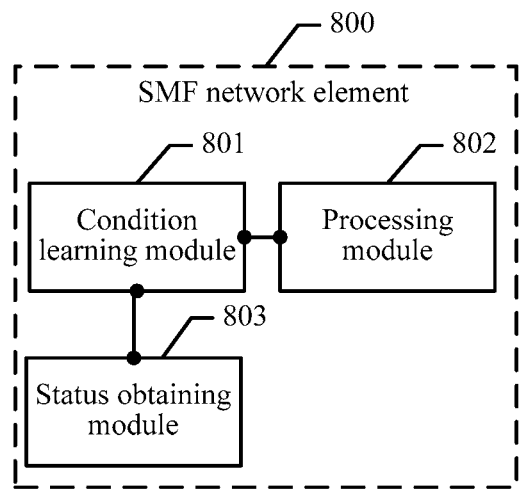
FIG. 8-b
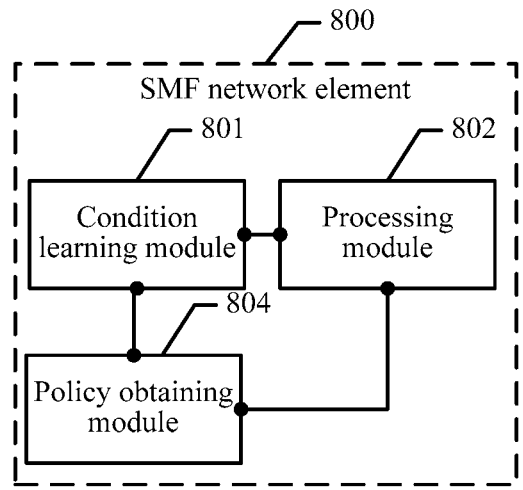
FIG. 8-c

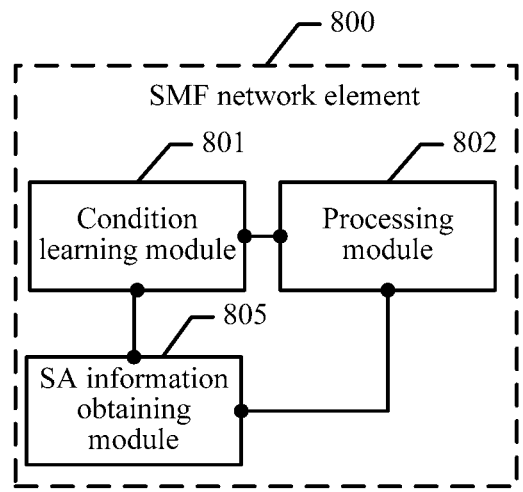
FIG. 8-d
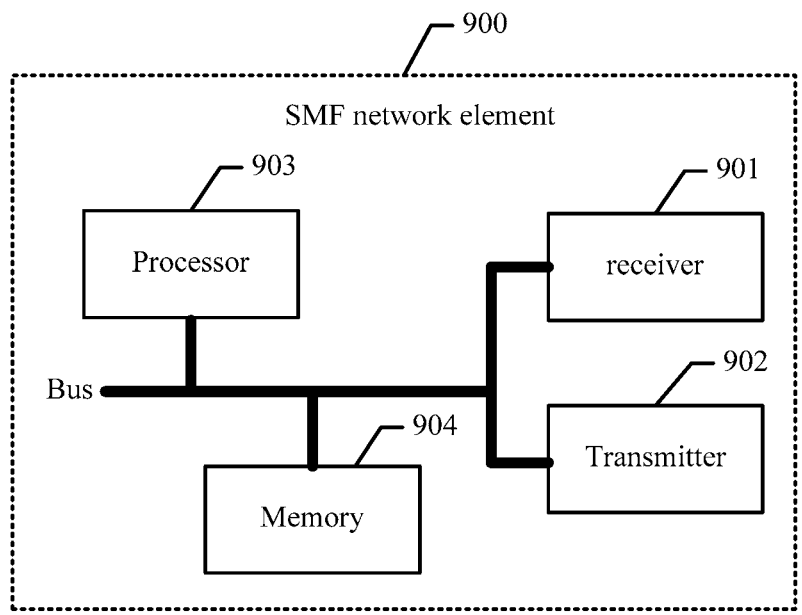
FIG. 9

METHOD AND APPARATUS FOR SUPPORTING USER'S MOBILITY OVER A LOCAL AREA DATA NETWORK

CROSS-REFERENCE TO RELATED APPLICATIONS

This application is a continuation of International Application No. PCT/CN2017/083586, filed on May 9, 2017, the disclosure of which is hereby incorporated by reference in its entirety.

TECHNICAL FIELD

Embodiments of this application relate to the communications field, and in particular, to a session management method and a session management function network element.

BACKGROUND

The 3rd Generation Partnership Project (3GPP) defines an architecture of a 5th generation mobile communications (5G) system.

A core network in the architecture of the 5G system may include the following logical network elements: an access and mobility management function (AMF) network element and a session management function (SMF) network element.

The 5G system provides a local area data network (LADN). The LADN is a network deployed mainly for scenarios such as enterprises, stadium activities, and concert halls. In a current LADN, no solution corresponding to how the SMF network element implements session management in a mobile network is provided. The session management of the SMF urgently requires a detailed implementation solution.

SUMMARY

Embodiments of this application provide a session management method and a session management function network element, to implement session management in an LADN scenario.

According to a first aspect, an embodiment of this application provides a session management method, including: learning, by a session management function SMF network element, of whether a first condition is met, where the first condition includes: a first location of a user equipment UE is outside a service area SA of a local area data network LADN; and when the first condition is met, stopping, by the SMF network element, data transmission of an LADN packet data unit PDU session of the LADN, and maintaining, by the SMF network element, a resource of the LADN PDU session.

In an embodiment of this application, the SMF may learn of whether the first location of the UE is outside the SA of the LADN. When the UE is outside the SA of the LADN, the SMF may stop the data transmission of the LADN PDU session, and the SMF maintains the resource of the LADN PDU session. Therefore, a specific solution is provided for session management in an LADN scenario. In addition, in this solution, high signaling overheads caused by frequent movement of the UE into and out of the SA of the LADN can be avoided. The resource of the LADN PDU session is maintained, so that the UE does not need to re-establish the LADN PDU session when re-entering the SA of the LADN, thereby saving signaling overheads and improving data transmission efficiency of the LADN.

According to a second aspect, an embodiment of this application further provides an SMF network element, including: learning, by a session management function SMF network element, of whether a first condition is met, where the first condition includes: a first location of a user equipment UE is outside a service area SA of a local area data network LADN; and when the first condition is met, based on a policy, stopping, by the SMF network element, data transmission of an LADN packet data unit PDU session of the LADN and maintaining, by the SMF network element, a resource of the LADN PDU session; or releasing the LADN PDU session, where the policy is associated with at least one of user information of the UE and identification information of the LADN.

In another embodiment of this application, the SMF may learn of whether the first location of the UE is outside the SA of the LADN. When the UE is outside the SA of the LADN, the SMF may stop the data transmission of the LADN PDU session based on the policy, and the SMF maintains the resource of the LADN PDU session; or the SMF releases the LADN PDU session. Therefore, a specific solution is provided for session management in an LADN scenario. The SMF may manage the LADN PDU session based on the policy, so that the SMF can implement different session management functions by using specific configurations for the policy. Therefore, flexible management on the LADN PDU session can be further implemented by using this solution.

With reference to the first aspect or the second aspect, in a first possible implementation of the first aspect or the second aspect, the learning, by a session management function SMF network element, of whether a first condition is met includes: obtaining, by the SMF network element, the first location of the UE, and determining, based on the first location of the UE, whether the UE is outside the SA of the LADN; or obtaining, by the SMF network element, a notification message indicating whether the UE is outside the SA of the LADN, and learning, based on the notification message, of whether the UE is outside the SA of the LADN. The SMF network element may obtain the first location of the UE, and determine, based on the first location, whether the UE is outside the SA of the LADN; or may learn, by parsing the notification message, of whether the UE is outside the SA of the LADN. Therefore, the SMF network element may learn of whether the UE meets the first condition.

With reference to the first aspect or the second aspect or the first possible implementation, in a second possible implementation of the first aspect or the second aspect, the method further includes: obtaining, by the SMF network element, a status of the LADN PDU session, where the first condition further includes: the LADN PDU session is in an activation state. The foregoing session management may be performed when the first location of the UE is outside the SA of the LADN and the LADN PDU session is in the activation state, so that session management on the LADN PDU session in the activation state is implemented.

With reference to the first aspect or the second aspect or the first or second possible implementation, in a third possible implementation of the first aspect or the second aspect, the stopping data transmission of an LADN PDU session of the local area data network LADN includes: notifying, by the SMF network element, a user plane function UPF network element to buffer or discard received downlink data; or maintaining, by the SMF network element, the status of the LADN PDU session in a deactivation state when the SMF network element receives a downlink data notification from the UPF network element. When the UE is inside the SA of the LADN, the UPF network element may send the buffered downlink data to the UE when restoring the LADN PDU session. Therefore, the downlink data sent by a DN to the UE is not lost. The SMF network element may stop the data transmission of the LADN PDU session by maintaining the deactivation state of the LADN PDU session.

With reference to the third possible implementation of the first aspect or the second aspect, in a fourth possible implementation of the first aspect or the second aspect, the notifying, by the SMF network element, a user plane function UPF network element to buffer or discard received downlink data includes: notifying, by the SMF network element, the UPF network element to enable a timer and buffer or discard the received downlink data before the timer expires; and the method further includes: receiving, by the SMF network element, a downlink data notification from the UPF network element when the UPF network element receives downlink data after the timer expires; and triggering, by the SMF network element, establishment of a transmission resource of the LADN PDU session in response to the received downlink data notification. After the timer expires, the UPF network element may restore sending of the downlink data notification to the SMF, so that the SMF network element triggers the establishment of the transmission resource of the LADN PDU session. The establishment of the transmission resource of the LADN PDU session means that the LADN PDU session enters the activation state, thereby implementing adaptive restoration of the status of the LADN PDU session.

With reference to the third possible implementation of the first aspect or the second aspect, in a fifth possible implementation of the first aspect or the second aspect, the notifying, by the SMF network element, a user plane function UPF network element to buffer or discard received downlink data includes: enabling, by the SMF network element, a timer, and notifying the UPF network element to buffer or discard the received downlink data when the UPF network element receives the downlink data; and the method further includes: after the timer expires, notifying, by the SMF network element, the UPF network element to send a downlink data notification to the SMF network element when the UPF network element receives downlink data. After the timer expires, the SMF network element notifies the UPF network element to send the downlink data notification when the UPF network element receives the downlink data, so that the SMF network element can complete automatic switching between various types of session management by using the timer.

With reference to the third possible implementation of the first aspect or the second aspect, in a sixth possible implementation of the first aspect or the second aspect, the maintaining, by the SMF network element, the status of the LADN PDU session in a deactivation state when the SMF network element receives a downlink data notification from the UPF network element includes: enabling, by the SMF network element, a timer, and before the timer expires, maintaining, by the SMF network element, the status of the LADN PDU session in the deactivation state when the SMF network element receives the downlink data notification from the UPF network element; and the method further includes: after the timer expires, triggering, by the SMF network element, establishment of a transmission resource of the LADN PDU session when the SMF network element receives the downlink data notification from the UPF network element. By using the timer set by the SMF network element, the SMF network element may restore triggering of the establishment of the transmission resource of the LADN PDU session after the timer expires, in other words, trigger the LADN PDU session to enter the activation state, thereby implementing adaptive restoration of the status of the LADN PDU session.

With reference to the first or second or third or fourth or fifth or sixth possible implementation of the first aspect or the second aspect, in a seventh possible implementation of the first aspect or the second aspect, the maintaining a resource of the LADN PDU session includes: maintaining, by the SMF network element, a radio access network RAN resource and a UPF network element resource of the LADN PDU session; or releasing, by the SMF network element, a RAN resource of the LADN PDU session, and maintaining a UPF network element resource of the LADN PDU session; or releasing, by the SMF network element, a RAN resource and a UPF network element resource of the LADN PDU session, and maintaining, by the SMF network element, an SMF network element resource. The resource of the LADN PDU session is maintained, so that the UE does not need to re-establish the LADN PDU session when re-entering the SA of the LADN, thereby saving signaling overheads and improving data transmission efficiency of the LADN.

With reference to the seventh possible implementation of the first aspect or the second aspect, in an eighth possible implementation of the first aspect or the second aspect, the releasing, by the SMF network element, a RAN resource of the LADN PDU session includes: notifying, by the SMF network element via an AMF network element, a RAN to release the RAN resource; or notifying, by the SMF network element, the UPF network element to release the UPF network element resource, so that when the RAN sends uplink data to the UPF network element, the UPF network element returns error information to the RAN, and the RAN releases the RAN resource based on the error information. The RAN may release the RAN resource based on the notification of the SMF network element, or the RAN may release the RAN resource based on the error information from the UPF network element. The RAN releases the RAN resource, so that the data transmission of the LADN PDU session can be stopped.

With reference to the first or second or third or fourth or fifth or sixth or seventh or eighth possible implementation of the first aspect or the second aspect, in a ninth possible implementation of the first aspect or the second aspect, the method further includes: learning, by the SMF network element, of whether a second condition is met, where the second condition includes: a second location obtained after the UE moves is inside the SA of the LADN; and when the second condition is met, restoring, by the SMF network element, the data transmission of the LADN PDU session. When the second location of the UE is inside the SA of the LADN, the SMF network element may restore the data transmission of the LADN PDU session, so that the LADN can continue to provide a network service for the UE.

With reference to the first or second or third or fourth or fifth or sixth or seventh or eighth or ninth possible implementation of the second aspect, in a tenth possible implementation of the second aspect, the method further includes: obtaining, by the SMF network element, the policy from a local policy of the SMF network element; or obtaining, by the SMF network element, the policy from a policy control function PCF network element. The policy used by the SMF network element may be stored in the local policy of the SMF network element or on a side of the PCF network element, so that the SMF network element can manage the LADN PDU session based on the obtained policy.

With reference to the first or second or third or fourth or fifth or sixth or seventh or eighth or ninth or tenth possible implementation of the first aspect or the second aspect, in an eleventh possible implementation of the first aspect or the second aspect, the obtaining, by the SMF network element, the first location of the UE includes: when the UE is in an idle state, receiving, by the SMF network element, the downlink data notification from the UPF network element, and triggering, by the SMF network element based on the downlink data notification, the access and mobility management function AMF network element to page the UE; and when the UE initiates a service request in response to the paging, obtaining, by the SMF network element, the first location of the UE from the RAN by using the AMF network element; or subscribing, by the SMF network element, to location information of the UE from the AMF network element, and receiving, by the SMF network element, the first location from the AMF network element.

With reference to the first or second or third or fourth or fifth or sixth or seventh or eighth or ninth or tenth or eleventh possible implementation of the first aspect or the second aspect, in a twelfth possible implementation of the first aspect or the second aspect, the method further includes: obtaining, by the SMF network element, information about the SA of the LADN from the PCF network element or the AMF network element. The information that is about the SA of the LADN and used by the SMF network element is obtained from the PCF network element or the AMF network element, so that the SMF network element can determine, by using the obtained information about the SA and the location information of the UE, whether the UE is outside the SA.

According to a third aspect, an embodiment of this application further provides a session management function SMF network element, including: a condition learning module, configured to learn of whether a first condition is met, where the first condition includes: a first location of a user equipment UE is outside a service area SA of a local area data network LADN; and a processing module, configured to: when the first condition is met, stop data transmission of an LADN packet data unit PDU session of the LADN, and maintain a resource of the LADN PDU session.

In an embodiment of this application, the SMF may learn of whether the first location of the UE is outside the SA of the LADN. When the UE is outside the SA of the LADN, the SMF may stop the data transmission of the LADN PDU session, and the SMF maintains the resource of the LADN PDU session. Therefore, a specific solution is provided for session management in an LADN scenario. In addition, in this solution, high signaling overheads caused by frequent movement of the UE into and out of the SA of the LADN can be avoided. The resource of the LADN PDU session is maintained, so that the UE does not need to re-establish the LADN PDU session when re-entering the SA of the LADN, thereby saving signaling overheads and improving data transmission efficiency of the LADN.

According to a fourth aspect, an embodiment of this application further provides a session management function SMF network element, including: a condition learning module, configured to learn of whether a first condition is met, where the first condition includes: a first location of a user equipment UE is outside a service area SA of a local area data network LADN; and a processing module, when the first condition is met, based on a policy, configured to: stop data transmission of an LADN packet data unit PDU session of the local area data network LADN, and maintain a resource of the LADN PDU session; or release the LADN PDU session, where the policy is associated with at least one of user information of the UE and identification information of the LADN.

In another embodiment of this application, the SMF may learn of whether the first location of the UE is outside the SA of the LADN. When the UE is outside the SA of the LADN, the SMF may stop the data transmission of the LADN PDU session based on the policy, and the SMF maintains the resource of the LADN PDU session; or the SMF releases the LADN PDU session. Therefore, a specific solution is provided for session management in an LADN scenario. The SMF may manage the LADN PDU session based on the policy, so that the SMF can implement different session management functions by using specific configurations for the policy. Therefore, flexible management on the LADN PDU session can be further implemented by using this solution.

In the third aspect or the fourth aspect of this application, composition modules of the SMF network element may further perform the steps described in the first aspect or the second aspect and the various possible implementations. For details, refer to the foregoing descriptions in the first aspect or the second aspect and the various possible implementations.

According to a fifth aspect, an embodiment of this application further provides a session management function SMF network element. The SMF includes a processor, a memory, a transmitter, and a receiver; and the processor, the transmitter, the receiver, and the memory communicate with each other by using a bus; the transmitter is configured to send data and the receiver is configured to receive data; the memory is configured to store an instruction; and the processor is configured to execute the instruction in the memory, to perform the method according to either of the first aspect or the second aspect.

A sixth aspect of this application provides a computer-readable storage medium. The computer-readable storage medium stores an instruction, and when the instruction runs on a computer, the computer performs the methods according to the foregoing aspects.

A seventh aspect of this application provides a computer program product including an instruction, and when the computer program product runs on a computer, the computer performs the methods according to the foregoing aspects.

BRIEF DESCRIPTION OF DRAWINGS

FIG. 1-*a* is a schematic diagram of a system architecture of a 5G system to which a session management method is applied according to an embodiment of this application;

FIG. 1-*b* is a schematic diagram of an LADN application scenario according to an embodiment of this application;

FIG. 8-*a* is a schematic structural diagram of composition of an SMF network element according to an embodiment of this application;

FIG. 8-*b* is a schematic structural diagram of composition of another SMF network element according to an embodiment of this application;

FIG. 8-*c* is a schematic structural diagram of composition of another SMF network element according to an embodiment of this application;

FIG. 8-*d* is a schematic structural diagram of composition of another SMF network element according to an embodiment of this application; and FIG. 9 is a schematic structural diagram of composition of another SMF network element according to an embodiment of this application.

DESCRIPTION OF EMBODIMENTS

Figure 2:
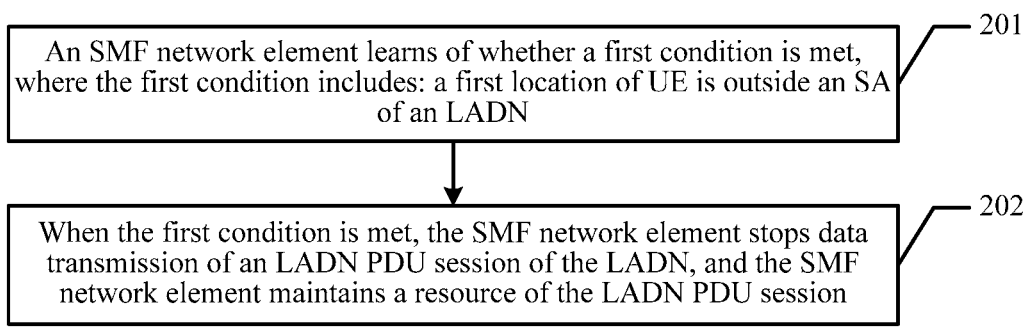
FIG. 2 is a schematic block flowchart of a session management method according to an embodiment of this application.

Embodiments of this application provide a session management method and a session management function network element, to implement session management in an LADN scenario.

The following describes the embodiments of this application with reference to accompanying drawings.

In the specification, claims, and accompanying drawings of this application, the terms "first", "second", and the like are intended to distinguish between similar objects but do not necessarily indicate a specific order or sequence. It should be understood that the terms used in such a way are interchangeable in proper circumstances, which is merely a discrimination manner that is used when objects having a same attribute are described in the embodiments of this application. In addition, the terms "include", "contain" and any other variants mean to cover the non-exclusive inclusion, so that a process, method, system, product, or device that includes a series of units is not necessarily limited to those units, but may include other units not expressly listed or inherent to such a process, method, system, product, or device.

The session management method provided in the embodiments of this application may be applied to a session management function SMF network element or another network device having a session management function in a 5G system. Referring to FIG. 1-*a*, FIG. 1-*a* is a schematic diagram of a system architecture of a 5G system to which a session management method is applied according to an embodiment of this application. The architecture of the 5G system is divided into two parts: an access network and a core network. The access network is used to implement a radio access-related function, and the access network includes a radio access network (RAN). The core network mainly includes the following several key logical network elements: an AMF network element, an SMF network element, a user plane function (UPF) network element, a policy control function (PCF) network element, a unified data management (UDM) network element, and an application function (AF) network element.

The AMF network element is mainly responsible for mobility management in a mobile network, for example, user location update, registration of a user with a network, and user handover.

The SMF network element is mainly responsible for session management in the mobile network. For example, specific functions of the SMF network element may include: allocating an Internet Protocol (IP) address to a user, selecting the UPF network element that provides a packet forwarding function, and the like.

The UPF network element is mainly responsible for processing a user packet, for example, forwarding and charging.

The PCF network element is responsible for providing policies such as a slicing selection policy and a quality of service (QoS) policy to the AMF network element and the SMF network element.

The UDM network element is configured to store user subscription information.

The 5G system may further include an authentication server function (AUSF) network element, a user equipment (UE), and a data network (DN).

The UE is a network terminal device such as a mobile phone or a terminal device of the Internet of Things. The UE establishes an LADN packet data unit (PDU) session between the UE and the RAN, between the RAN and the UPF network element, and between the UPF network element and the DN, so that the UE can access the data network (DN) by using the LADN PDU session. The LADN PDU session may include an active (activation) state and an inactive (deactivation) state. For a session of the UE, when there is a user plane connection between the UE and the RAN, and between the RAN and the UPF network element, in other words, the RAN and the UPF network element have resources related to the LADN PDU session, the session is in the activation state. When there is no user plane connection between the UE and the RAN, and between the RAN and the UPF network element, but the SMF network element and the UPF network element store some session contexts such as the IP address of the UE and a session identifier (session ID), in other words, the RAN has no session resource but the UPF network element has a session resource, the LADN PDU session is in the deactivation state. When there is a non-access stratum (NAS) signaling connection between the UE and the AMF network element, the UE is in a connected state. When the UE is already registered with a network, but there is no NAS signaling connection between the UE and the AMF network element, the UE is in an idle state.

Referring to FIG. 1-*b*, FIG. 1-*b* is a schematic diagram of an LADN application scenario according to an embodiment of this application. An LADN has the following characteristic: a UE can access the LADN only when the UE is in a service area (SA) of the LADN. As shown in FIG. 1-*b*, the SA of the LADN includes three tracking areas (TA): TA 1, TA 2, and TA 3. Because a RAN 1 is within coverage of the SA of the LADN, when the UE moves into the coverage of RAN 1, the UE may establish a session for accessing the LADN. When the UE continues to move and moves into a coverage of RAN 2, because the RAN 2 is beyond the coverage of the SA of the LADN, the UE cannot access the LADN by using the RAN 2.

No solution corresponding to how an SMF implements session management in a mobile network based on the LADN shown in FIG. 1-*b* is provided in the prior art. In an embodiment of this application, the SMF may perform the following session management solution.

FIG. 2 shows a session management method according to an embodiment of this application. The method may include the following steps.

201. An SMF network element learns of whether a first condition is met, where the first condition includes: a first location of UE is outside an SA of an LADN.

In this embodiment of this application, the SMF network element may be configured to manage an LADN PDU session. In the LADN, network elements at wireless side include the UE and a RAN. The SMF network element first learns of whether a current location of the UE is outside the SA of the LADN. For ease of description, the current location of the UE is defined as the "first location", and that the first location of the UE is outside the SA of the LADN is defined as the "first condition". To be specific, when the first condition is met, the first location of the UE is outside the SA of the LADN. When the first condition is not met, the first location of the UE is inside the SA of the LADN.

It should be noted that, that an SMF network element learns of whether a first condition is met in step 201 may be implemented by: the SMF network element obtains the first location of the UE, and determines, based on the first location, whether the UE is outside the SA of the LADN. Alternatively, when the LADN PDU session is in a deactivation state, in step 201, the SMF network element may obtain a notification message indicating whether the UE is outside the SA of the LADN, and the SMF network element learns, based on the notification message, that the first location of the UE is outside the SA of the LADN. That the LADN PDU session is in the deactivation state includes at least the following two cases: (1) the UE is in a connected state and the LADN PDU session is in the deactivation state; (2) the UE is in an idle state.

202. When the first condition is met, the SMF network element stops data transmission of an LADN PDU session of the LADN, and the SMF network element maintains a resource of the LADN PDU session.

In this embodiment of this application, the SMF network element may learn of whether the first condition is met, and perform step 202 when the first condition is met. The SMF network element may manage the LADN PDU session in a plurality of manners. For example, the SMF network element may stop the data transmission of the LADN PDU session of the LADN, and the SMF network element maintains the resource of the LADN PDU session. That the SMF network element stops data transmission of an LADN PDU session of the LADN means that the SMF pauses the data transmission of the LADN PDU session, and the SMF may maintain the resource of the LADN PDU session. In other words, the resource of the LADN PDU session still exists, and only the data transmission of the LADN PDU session is paused. In this embodiment of this application, the SMF network element determines, based on the first location of the UE, whether the UE is outside the SA of the LADN, so that the SMF network element can determine whether the first condition is met. For example, as shown in FIG. 1-*b*, when the UE is connected to a RAN 1, the current location of the UE is inside the SA of the LADN. When the UE is connected to a RAN 2 after the UE moves, the location of the UE is outside the SA of the LADN. Specifically, the first condition includes: the first location of the UE is outside the SA of the LADN. When the first location of the UE is outside the SA of the LADN, the LADN cannot provide a network service for the UE.

For example, it can be learned from the foregoing descriptions of an LADN scenario that, in the prior art, for UE in a connected state, when the UE frequently moves into and out of the SA of the LADN, high signaling overheads are caused. The signaling is used to disconnect or re-establish the LADN PDU session. For UE in an idle state, when downlink data (DL) arrives for the LADN PDU session, the UE needs to be frequently paged, and consequently overheads are increased. Based on the foregoing solution of this application, the SMF network element may stop the data transmission of the LADN PDU session, and the SMF network element maintains the resource of the LADN PDU session. Therefore, a specific solution is provided for session management in the LADN scenario. In addition, in this solution, high signaling overheads caused by frequent movement of the UE into and out of the SA of the LADN can be avoided. The resource of the LADN PDU session is maintained, so that the UE does not need to re-establish the LADN PDU session when re-entering the SA of the LADN, thereby saving signaling overheads and improving data transmission efficiency of the LADN.

Figure 3:
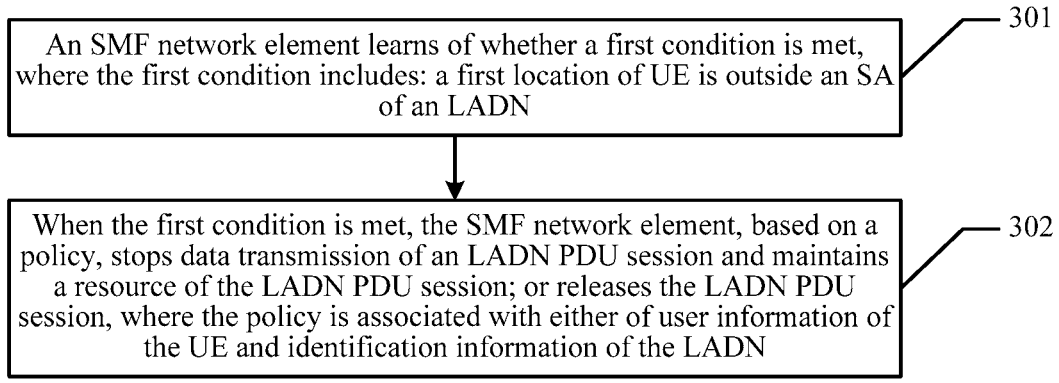
FIG. 3 is a schematic block flowchart of another session management method according to an embodiment of this application.

FIG. 3 shows a session management method according to an embodiment of this application. The method may include the following steps.

301. An SMF network element learns of whether a first condition is met, where the first condition includes: a first location of user equipment UE is outside a service area SA of a local area data network LADN.

In this embodiment of this application, the SMF network element may be configured to manage an LADN PDU session. In the LADN, network elements at wireless side include the UE and a RAN. The SMF network element first learns of whether a current location of the UE is outside the SA of the LADN. That an SMF network element learns of whether a first condition is met in step 301 may be implemented by: the SMF network element obtains the first location of the UE, and determines, based on the first location, whether the UE is outside the SA of the LADN. Alternatively, when the LADN PDU session is in a deactivation state, in step 301, the SMF network element may obtain a notification message indicating whether the UE is outside the SA of the LADN, and the SMF network element learns, based on the notification message, that the first location of the UE is outside the SA of the LADN. That the LADN PDU session is in the deactivation state includes at least the following two cases: (1) the UE is in a connected state and the LADN PDU session is in the deactivation state; (2) the UE is in an idle state.

302. When the first condition is met, the SMF network element, based on a policy, stops data transmission of an LADN PDU session and maintains a resource of the LADN PDU session; or releases an LADN PDU session, where the policy is associated with at least one of user information of the UE and identification information of the LADN.

In this embodiment of this application, the SMF network element may learn of whether the first condition is met, and perform step 302 when the first condition is met. The SMF network element may manage the LADN PDU session in a plurality of manners based on the policy.

In step 302, the SMF network element selects, based on the policy, to perform either of the following two operations: The SMF network element stops the data transmission of the LADN PDU session and maintains the resource of the LADN PDU session based on the policy; or the SMF network element releases the LADN PDU session based on the policy.

For how to stop the data transmission of the LADN PDU session and maintain the resource of the LADN PDU session, refer to the foregoing descriptions of step 202. That the SMF network element releases an LADN PDU session means that the SMF disconnects the LADN PDU session. Releasing the LADN PDU session may include: releasing a RAN resource, releasing a UPF network element resource, and releasing an SMF network element resource.

For example, it can be learned from the foregoing descriptions of an LADN scenario that, in the prior art, for UE in a connected state, when the UE frequently moves into and out of the SA of the LADN, high signaling overheads are caused. The signaling is used to disconnect or re-establish the LADN PDU session. For UE in an idle state, when DL data arrives for the LADN PDU session, the UE needs to be frequently paged, and consequently overheads are increased. In this embodiment of this application, the SMF network element may stop the data transmission of the LADN PDU session and the SMF network element maintains the resource of the LADN PDU session based on the policy; or the SMF network element releases the LADN PDU session based on the policy. Therefore, a specific solution is provided for session management in the LADN scenario. The SMF network element may manage the LADN PDU session based on the policy, so that the SMF network element can perform different session management functions by using specific configurations for the policy. Therefore, flexible management on the LADN PDU session can be further implemented by using the solution.

In some embodiments of this application, before step 202 or step 302, the session management method provided in this embodiment of this application further includes the following step.

A1. The SMF network element obtains a status of the LADN PDU session.

It can be learned from the foregoing descriptions that the status of the LADN PDU session includes an activation state and a deactivation state. In an implementation scenario in which the SMF network element performs step A1, the first condition in step 202 or step 302 further includes: the LADN PDU session is in the activation state. Using step 202 as an example, when the first location of the UE is outside the SA of the LADN and the LADN PDU session is in the activation state, step 202 may be performed, so that session management on the LADN PDU session in the activation state is implemented.

In some embodiments of this application, the above step 202 or step 302, that the SMF network element stops data transmission of an LADN PDU session of the LADN includes the following step.

B1. The SMF network element notifies the UPF network element to buffer or discard received downlink data; or B2. the SMF network element maintains the status of the LADN PDU session in a deactivation state when the SMF network element receives a downlink data notification from the UPF network element.

In step B1, when the UPF network element receives the downlink data, the UPF network element may buffer or discard the downlink data based on the notification of the SMF network element, to stop the data transmission of the LADN PDU session. In this way, a solution to a case in which the UE cannot use the LADN when the first location of the UE is outside the SA of the LADN is provided. For example, when the UE is inside the SA of the LADN and the LADN PDU session is restored, the UPF network element may send the buffered downlink data to the UE. Therefore, the downlink data sent by a DN to the UE is not lost. For another example, the UPF network element buffers or discards the downlink data when receiving the downlink data, in other words, the UPF network element does not forward the downlink data to the UE, to pause transmission of the downlink data. In step B2, when the UPF network element receives the downlink data from the DN, the UPF network element sends the downlink data notification to the SMF network element, so that the SMF network element maintains the status of the LADN PDU session in the deactivation state. When the LADN PDU session is in the deactivation state, the data transmission cannot be performed. Therefore, the SMF network element may maintain the deactivation state of the LADN PDU session to stop the data transmission of the LADN PDU session.

Further, in some embodiments of this application, that the SMF network element notifies the UPF network element to buffer or discard received downlink data in step B1 includes the following step.

B11. The SMF network element notifies the UPF network element to enable a timer and buffer or discard the received downlink data before the timer expires.

In a scenario of performing step B11, the method provided in this embodiment of this application further includes the following steps.

B3. The SMF network element receives a downlink data notification from the UPF network element when the UPF network element receives downlink data after the timer expires.

B4. The SMF network element triggers, in response to the received downlink data notification, the LADN PDU session to enter an activation state.

In other words, the SMF network element notifies the UPF network element to enable the timer and buffer or discard the downlink data before the timer expires. The UPF network element sends the downlink data notification to the SMF network element when the UPF network element receives the downlink data after the timer expires, so that the SMF network element triggers the LADN PDU session to enter the activation state. By using the timer set by the UPF network element, the UPF network element may restore sending of the downlink data notification to the SMF after the timer expires, so that the SMF network element triggers establishment of a transmission resource of the LADN PDU session. The establishment of the transmission resource of the LADN PDU session means that the LADN PDU session enters the activation state, thereby implementing adaptive restoration of the status of the LADN PDU session.

Further, in some other embodiments of this application, that the SMF network element notifies the UPF network element to buffer or discard received downlink data in step B1 includes the following step.

B12. The SMF network element enables a timer, and notifies the UPF network element to buffer or discard the received downlink data when the UPF network element receives the downlink data.

In a scenario of performing step B12, the session management method provided in some embodiments of this application further includes the following step.

B5. After the timer expires, the SMF network element notifies the UPF network element to send the downlink data notification to the SMF network element when the UPF network element receives the downlink data.

In some embodiments of this application, that the SMF network element maintains the status of the LADN PDU session in a deactivation state when the SMF network element receives a downlink data notification from the UPF network element in step B2 includes the following step.

B21. Before the timer expires, the SMF network element maintains the status of the LADN PDU session in the deactivation state when the SMF network element receives the downlink data notification from the UPF network element.

In a scenario of performing step B21, the method provided in this embodiment of this application further includes the following step.

B6. After the timer expires, the SMF network element triggers establishment of a transmission resource of the LADN PDU session when the SMF network element receives the downlink data notification from the UPF network element.

In other words, the SMF network element enables the timer and notifies the UPF network element to buffer or discard the downlink data when the UPF network element receives the downlink data. Before the timer expires, when receiving the downlink data notification from the UPF network element, the SMF network element does not trigger the LADN PDU session to enter the activation state. After the timer expires, the SMF network element receives the downlink data notification from the UPF network element. By using the timer set by the SMF network element, the SMF network element may restore triggering of the establishment of the transmission resource of the LADN PDU session after the timer expires, in other words, trigger the LADN PDU session to enter the activation state, thereby implementing adaptive restoration of the status of the LADN PDU session.

In some embodiments of this application, the above step 202 or step 302, that the SMF network element maintains a resource of the LADN PDU session includes the following step.

C1. The SMF network element maintains a radio access network RAN resource and a UPF network element resource for the LADN PDU session; or C2. the SMF network element releases a RAN resource for the LADN PDU session, but maintains a UPF network element resource for the LADN PDU session; or C3. the SMF network element releases a RAN resource and a UPF network element resource for the LADN PDU session, but maintains an SMF network element resource for the LADN PDU session.

In the foregoing embodiments of this application, the resource of the LADN PDU session may specifically include the RAN resource, the UPF network element resource, and the SMF network element resource. That the SMF network element maintains a resource of the LADN PDU session may be specifically: maintaining at least one of the RAN resource, the UPF network element resource, and the SMF network element resource. The RAN resource includes a radio resource between the RAN and the UE, a tunnel connection between the RAN and the UPF, QoS of the session, and the like. The UPF network element resource includes the tunnel connection between the RAN and the UPF network element, a session identifier, QoS of the session, an IP address of the UE corresponding to the session, and the like. The SMF network element resource includes the session identifier, a session status, a UPF identifier, and the like. The resource of the LADN PDU session may be maintained by using the foregoing implementation, so that high signaling overheads caused by frequent movement of the UE into and out of the SA of the LADN can be avoided. The resource of the LADN PDU session is maintained, so that the UE does not need to re-establish the LADN PDU session when re-entering the SA of the LADN, thereby saving signaling overheads and improving data transmission efficiency of the LADN.

Further, that the SMF network element releases a RAN resource of the LADN PDU session in step C1 or step C2 includes:

notifying, by the SMF network element via an AMF network element, a RAN to release the RAN resource; or notifying, by the SMF network element, the UPF network element to release the UPF network element resource, so that when the RAN sends uplink data to the UPF network element, the UPF network element returns error information to the RAN, and the RAN releases the RAN resource based on the error information.

The RAN may release the RAN resource based on the notification of the SMF network element, or the RAN may release the RAN resource based on the error information sent by the UPF network element. The RAN releases the RAN resource, so that the data transmission of the LADN PDU session can be stopped.

In some embodiments of this application, in an implementation scenario of performing step 201 and step 202 or in an implementation scenario of performing step 301 and step 302, the session management method provided in this embodiment of this application further includes the following steps.

D1. The SMF network element learns of whether a second condition is met, where the second condition includes: a second location obtained after the UE moves is inside the SA of the LADN.

D2. When the second condition is met, the SMF network element restores the data transmission of the LADN PDU session.

The UE may move in real time. For example, the UE moves from the first location to the second location. The SMF network element learns of whether the second condition is met. For example, the SMF network element obtains the second location obtained after the UE moves, so that the SMF network element can determine whether the second condition is met. When the second condition is met, step D2 is performed. It can be learned from the descriptions of step 202 and step 302 that the SMF network element stops the data transmission of the LADN PDU session of the LADN when the UE is at the first location. In this embodiment of this application, the SMF network element learns of whether the UE is outside the SA of the LADN, so that the SMF network element can learn of whether the second condition is met. For example, as shown in FIG. 1-b, when the UE is connected to a RAN 1, a current location of the UE is inside the SA of the LADN. When the UE is connected to a RAN 2 after the UE moves, a location of the UE is outside the SA of the LADN. Specifically, the second condition includes: the second location of the UE is inside the SA of the LADN. When the second location of the UE is inside the SA of the LADN, the SMF network element may restore the data transmission of the LADN PDU session, so that the LADN can continue to provide a network service for the UE.

In some embodiments of this application, in the implementation scenario of performing step 301 and step 302, the session management method provided in this embodiment of this application further includes the following step.

E1. The SMF network element obtains the policy from a local policy of the SMF network element; or E2. the SMF network element obtains the policy from a PCF network element.

The policy used by the SMF network element in step 302 may be stored in the local policy of the SMF network element. For example, the SMF network element obtains the policy used in step 302 from a local memory. The SMF network element may alternatively obtain the policy used in step 302 from the PCF network element. The PCF network element stores the policy, and the PCF network element may provide the policy for the SMF network element, so that the SMF network element can manage the LADN PDU session based on the obtained policy.

In some embodiments of this application, in the implementation scenario of performing step 201 and step 202 or in the implementation scenario of performing step 301 and step 302, that an SMF network element learns of whether a first condition is met in step 201 or step 301 includes the following step.

F1. The SMF network element obtains the first location of the UE, and determines, based on the first location of the UE, whether the UE is outside the SA of the LADN; or F2. the SMF network element obtains a notification message indicating whether the UE is outside the SA of the LADN, and learns, based on the notification message, of whether the UE is outside the SA of the LADN.

That an SMF network element learns of whether a first condition is met may be: the SMF network element obtains the first location of the UE, and determines, based on the first location, whether the UE is outside the SA of the LADN. Alternatively, when the LADN PDU session is in the deactivation state, the SMF network element may obtain the notification message indicating whether the UE is outside the SA of the LADN, and the SMF network element learns, based on the notification message, that the first location of the UE is outside the SA of the LADN. In the scenario shown in step F2, for example, the SMF network element subscribes to the notification message indicating whether the UE is outside the SA of the LADN from the AMF network element. When the AMF network element finds that the UE is outside the SA of the LADN, the SMF network element receives the notification message from the AMF network element. The AMF network element may determine, based on location information of the UE and the SA of the LADN, whether the UE is outside the SA of the LADN.

Further, that the SMF network element obtains the first location of the UE in step F1 may specifically include the following step.

F11. When the UE is in an idle state, the SMF network element receives the downlink data notification from the UPF network element, and the SMF network element triggers, based on the downlink data notification, the AMF network element to page the UE; and when the UE initiates a service request in response to the paging, the SMF network element obtains the first location of the UE from the RAN via the AMF network element, and determines, based on the first location, whether the UE is outside the SA of the LADN; or F12. the SMF network element subscribes to location information of the UE from the AMF network element, and the SMF network element receives the first location from the AMF network element and determines, based on the first location, whether the UE is outside the SA of the LADN.

In the scenario shown in step F11, the SMF network element triggers the AMF network element based on the downlink data notification, the AMF network element pages the UE in an idle state, and the UE initiates a service request procedure in response to the paging. In the foregoing service request procedure, the RAN sends the first location of the UE to the SMF network element via the AMF network element, and the SMF network element determines, based on the first location, whether the UE is outside the SA of the LADN.

In the scenario shown in step F12, the SMF subscribes to the location information of the UE from the AMF. When the AMF network element finds that the location of the UE changes, the SMF network element receives the first location from the AMF network element, and the SMF network element determines, based on the first location, whether the UE is outside the SA of the LADN.

In some embodiments of this application, in the implementation scenario of performing step 201 and step 202 or in the implementation scenario of performing step 301 and step 302, the session management method provided in this embodiment of this application further includes the following step.

G1. The SMF network element obtains information about the SA of the LADN from the PCF network element or the AMF network element.

The information that is about the SA of the LADN and used by the SMF network element is obtained from the PCF network element or the AMF network element. For example, the PCF network element stores the information about the SA of the LADN, and the PCF network element sends the information about the SA of the LADN to the SMF network element. For another example, the AMF network element stores the information about the SA of the LADN, and the AMF network element sends the information about the SA of the LADN to the SMF network element, so that the SMF network element can determine, based on the SA of the LADN and the first location of the UE, whether the UE is outside the SA of the LADN. Certainly, in some embodiments of this application, the SMF network element may alternatively obtain the information about the SA by local configuration. A specific implementation depends on an application scenario. This is not limited herein.

In some embodiments of this application, in an implementation scenario of performing step 302, the policy used by the SMF network element is described below by using an example. The policy used by the SMF network element may include at least the following four types of policies:

Type-1 policy: The SMF network element maintains the RAN resource and the UPF network element resource for the LADN PDU session, and the SMF network element notifies the UPF network element to buffer or discard the received downlink data.

Type-2 policy: The LADN PDU session enters a first state: The SMF network element releases the RAN resource for the LADN PDU session but maintains the UPF network element resource for the LADN PDU session, and the SMF network element notifies the UPF network element to buffer or discard the received downlink data.

Type-3 policy: The LADN PDU session enters a second state: The SMF network element releases the RAN resource for the LADN PDU session but maintains the UPF network element resource for the LADN PDU session, and when the SMF network element receives the downlink data notification from the UPF network element, the SMF network element maintains the status of the LADN PDU session in the deactivation state. In other words, when receiving the downlink data notification, the SMF does not trigger the LADN PDU session to restore the activation state.

Type-4 policy: The SMF network element releases the LADN PDU session, in other words, releases the RAN resource and the UPF resource.

The type-1 policy, the type-2 policy, and the type-3 policy may be summarized as follows: The SMF pauses the data transmission of the LADN PDU session and maintains the resource for the LADN PDU session. For details, refer to the detailed descriptions in the foregoing embodiments.

To better understand and implement the foregoing solution of the embodiments of this application, specific descriptions are provided below by using a corresponding application scenario as an example.

In a subsequent embodiment of this application, an example in which the UE moves and the SMF network element processes the LADN PDU session based on a policy is used for description. The policy may be a local policy, or may be a policy from the PCF network element. In the subsequent embodiment, the SMF network element may also be briefly referred to as an SMF. By analogy, the PCF network element is briefly referred to as a PCF, and the AMF network element is briefly referred to as an AMF.

The policy used by the SMF includes the type-1 policy to the type-4 policy.

In an example scenario of this application, there are at least the following two manners of releasing the RAN resource:

RAN resource release manner 1: The UPF resource is released. When sending uplink data to the UPF, the RAN receives error information returned by the UPF, so that the RAN resource is released.

RAN resource release manner 2: The SMF notifies the RAN to release the RAN resource.

In some embodiments of this application, the SMF or the PCF determines, based on an LADN name (LADNN) and/or user information, a policy in the type-1 policy to the type-4 policy that is to be used. For example, the user information may include a level of a user and a mobility attribute of the user. The level of the user may be a gold user, a silver user, or the like. The mobility attribute of the user may be a movement speed, a movement track, or the like of the user. The PCF determines, based on the user information and the LADN name, a policy to be used, and sends the policy to the SMF. For example, when a gold user accesses an LADNN 1 by using an LADN PDU session, the type-1 policy is used. In other words, the RAN resource is maintained, and when the UPF receives downlink data of the LADN PDU session, the UPF buffers the downlink data. For another example, the SMF determines, based on information about the LADN name, a policy to be used. For example, the type-2 policy is used for an LADN PDU session for accessing an LADNN 2, in other words, the RAN resource is maintained, and when the UPF receives downlink data of the LADN PDU session, the UPF discards the downlink data.

In some embodiments of this application, in a session establishment process, the SMF obtains the policy from the PCF. Alternatively, the policy is configured on the SMF in a local configuration manner.

In the session establishment process, a detailed implementation process in which the SMF obtains the policy from the PCF is as follows:

Step 1. The UE sends a session establishment request to the AMF via the RAN, where the session establishment request may carry an LADNN and a session ID of an LADN PDU session.

Step 2. The AMF selects an SMF from a plurality of SMFs based on information such as the LADNN and subscription data, and forwards the session establishment request to the SMF.

Step 3. The SMF sends the establishment request to the PCF, where the establishment request optionally carries the LADNN and a mobility attribute of a user, and the establishment request may be a PDU-connectivity access network (CAN) session establishment request and carry the LADNN.

Step 4. The PCF generates policy information and returns a session establishment response to the SMF, where the session establishment response carries the policy information; for example, the session establishment response may be a PDU-CAN session establishment response.

The PCF may generate the policy information based on the subscription data (such as the level of the user and subscribed LADNN information), or may generate the policy information based on the LADNN carried by the SMF in step 3, or may generate the policy information based on the mobility attribute of the user that is carried in step 3. Example 1: If the UE is the gold user and the UE accesses the LADNN 1, the PCF generates the type-1 policy. Example 2: If the UE is the silver user, the PCF generates the type-2 policy. Example 3: If the UE accesses the LADNN 2, the PCF generates the type-3 policy. Example 4: If the UE accesses an LADNN 3 and the movement speed of the user is relatively slow, the PCF generates the type-4 policy.

The policy information may be a specific policy, or may be a policy index. If the policy information is the policy index, the SMF obtains the policy index from the PCF, and then obtains a specific policy to be used through mapping between the policy index and the policy.

In some embodiments of this application, in an application scenario in which the status of the UE is the connected state, or in an application scenario in which the status of the UE is the connected state and the status of the LADN PDU session is the activation state, when the UE moves and is handed over, in a handover (HO) procedure of the UE, session management on the LADN PDU session is described by using an example:

The SMF obtains location information of the UE, and determines whether the UE is inside the SA of the LADN. When the UE is inside the SA of the LADN, the HO procedure of the UE is normally performed. When the UE is not inside the SA of the LADN, the SMF processes the LADN PDU session based on the policy. An example is provided below:

When the policy is the type-1 policy, the SMF pauses data transmission of the LADN PDU session based on the type-1 policy, in other words, the RAN resource and the UPF resource for the LADN PDU session are maintained, and when the UPF receives downlink data, the UPF may buffer or discard the downlink data.

When the policy is the type-2 policy, the SMF triggers, based on the type-2 policy, the LADN PDU session to enter a first state, in other words, the RAN resource is released while the UPF resource is maintained, and when the UPF receives downlink data, the UPF may buffer or discard the downlink data.

When the policy is the type-3 policy, the SMF triggers, based on the type-3 policy, the LADN PDU session to enter a second state, in other words, the RAN resource is released while the UPF resource is maintained, and when the SMF receives a downlink data notification, the SMF does not trigger the LADN PDU session to enter the activation state.

When the policy is the type-4 policy, the SMF releases the LADN PDU session based on the type-4 policy, in other words, releases the RAN resource, the UPF resource, and an SMF resource.

It should be noted that if the SMF uses the type-1 policy, because the location of the UE may change, when the SMF subsequently determines that the UE is inside the SA of the LADN, the SMF stops using the type-1 policy and restores the data transmission of the LADN PDU session. In the following two cases, the SMF stops using the policy: Case 1: When determining that the UE is inside the SA of the LADN, the SMF stops using the policy and restores the data transmission of the LADN PDU session. Case 2: When initiating the LADN PDU session to enter the deactivation state, the SMF stops using the type-1 policy. That the SMF initiates the LADN PDU session to enter the deactivation state may be specifically implemented in a UE context release procedure initiated by the AMF or the RAN, or in a session deactivation procedure initiated by the UE, the RAN, the SMF, the AMF, or the PCF.

It should further be noted that in a process in which the LADN PDU session enters the deactivation state, the SMF may manage the LADN PDU session based on the policy. Specifically, the SMF determines, based on whether the UE is inside the SA of the LADN, whether to use the policy to manage the session. If the UE is inside the SA of the LADN, when the SMF receives the downlink data notification, the SMF triggers the LADN PDU session to enter the activation state. If the UE is not inside the SA of the LADN, the SMF processes the LADN PDU session based on the policy. For example, if the policy is the type-2 policy, the SMF initiates the LADN PDU session to enter the first state, in other words, the UPF buffers or discards the downlink data when receiving the downlink data. Alternatively, if the policy is the type-3 policy, the SMF initiates the LADN PDU session to enter a second state, in other words, when receiving the downlink data notification, the SMF does not trigger the LADN PDU session to enter the activation state. Alternatively, if the policy is the type-4 policy, the SMF may release the LADN PDU session.

In some embodiments of this application, if the UE is not inside the SA of the LADN, the SMF network element may further perform the following session management solution:

Solution 1: The SMF network element notifies the UPF network element to enable a timer and buffer or discard the downlink data before the timer expires; and the UPF network element sends the downlink data notification to the SMF network element when the UPF network element receives the downlink data after the timer expires, so that the SMF network element triggers the LADN PDU session to enter the activation state.

Solution 2: The SMF network element enables a timer and notifies the UPF network element to buffer or discard the downlink data when the UPF network element receives the downlink data. Before the timer expires, when receiving the downlink data notification from the UPF network element, the SMF network element does not trigger the LADN PDU session to enter the activation state. After the timer expires, when receiving the downlink data notification from the UPF network element, the SMF network element triggers the LADN PDU session to enter the activation state.

It should be noted that in the foregoing two solutions, after the timer expires, when the SMF network element initiates the LADN PDU session to enter the activation state, if the SMF network element finds that the UE is still outside the SA of the LADN, the SMF network element re-enables the timer; otherwise, the SMF network element sets the timer to 0.

It should further be noted that in the foregoing two solutions, duration of the timer is less than duration of periodic location update. The duration of the periodic location update is set by the AMF network element. The duration of the periodic location update may be sent by the AMF network element to the SMF network element in the session establishment process. Specifically, the AMF sends, to the SMF, a session management request (SM Request) carrying the duration of the periodic location update.

It should further be noted that in the foregoing two solutions, when the duration of the timer is greater than or equal to the duration of the periodic location update, the AMF network element obtains the location information of the UE and notifies the SMF network element of the location information of the UE in a periodic location update process. The SMF network element determines whether the UE is inside the SA of the LADN. If the UE is inside the SA of the LADN, the SMF sets the timer to 0. If the UE is not inside the SA of the LADN, the SMF re-enables the timer.

In some embodiments of this application, in an application scenario in which the status of the UE is the connected state and the status of the LADN PDU session is the deactivation state, in the HO procedure or in a process in which the LADN PDU session enters the deactivation state, session management on the LADN PDU session is described by using an example:

(1) In the procedure in which the LADN PDU session enters the deactivation state, the SMF processes the LADN PDU session based on the policy.

(2) In the HO procedure, the SMF determines whether the UE is inside the SA of the LADN. When the UE is inside the SA of the LADN, the SMF maintains the deactivation state of the LADN PDU session. When the UE is not inside the SA of the LADN, the SMF processes the LADN PDU session based on the policy. For example, when the policy is the type-2 policy, the SMF initiates the LADN PDU session to enter the first state, in other words, the UPF buffers or discards the downlink data when receiving the downlink data. Alternatively, when the policy is the type-3 policy, the SMF initiates the LADN PDU session to enter the second state, in other words, when receiving the downlink data notification, the SMF does not trigger the LADN PDU session to enter the activation state. Alternatively, when the policy is the type-4 policy, the SMF may release the LADN PDU session.

It should be noted that when the SMF subscribes to a notification message indicating whether the UE is not inside the SA of the LADN from the AMF, in the HO procedure, the SMF may process the LADN PDU session in the following implementation: When the SMF receives the notification message from the AMF, the SMF processes the LADN PDU session based on the policy.

Because the UE is in the connected state, the SMF may always obtain the location information of the UE by using the AMF. Therefore, the SMF may process the LADN PDU session in the manner of (1) or (2). When the LADN PDU session is in the deactivation state, the UPF receives the downlink data, and processes the downlink data based on the method for processing the LADN PDU session in (1) or (2). Specifically, when the policy is the type-2 policy, the UPF buffers or discards the downlink data. When the policy is the type-3 policy, the UPF sends the downlink data notification to the SMF, and the SMF maintains the deactivation state of the session when receiving the downlink data notification.

In some embodiments of this application, in an application scenario in which the status of the UE is the idle state, because the LADN PDU session is in the deactivation state, when the downlink data of the LADN PDU session arrives, session management on the LADN PDU session is described by using an example:

Case 1: When the UE enters the idle state, and the LADN PDU session is processed by using the type-2 policy, the UPF buffers or discards the downlink data.

Case 2: When the UE enters the idle state, and the LADN PDU session is processed by using the type-3 policy, the SMF receives the downlink data notification, and does not trigger the LADN PDU session to enter the activation state.

Case 3: When the UE enters the idle state and the SMF does not use the foregoing policies. If the SMF receives the downlink data notification, the SMF triggers the AMF to page the UE. The UE initiates a service request procedure in response to the paging. In the service request procedure, the RAN further carries the location information when sending RAN-side tunnel information to the SMF via the AMF. The SMF determines, based on the location information and the SA of the LADN, whether the UE is inside the SA of the LADN. If the UE is inside the SA of the LADN, the SMF performs a subsequent step of the service request procedure. If the UE is not inside the SA of the LADN, the SMF processes the LADN PDU session based on the policy. A type of the selected policy includes: the type-2 policy, the type-3 policy, or the type-4 policy.

It should be noted that in this embodiment of this application, that the SMF stops data transmission of an LADN PDU session of the LADN, and the SMF network element maintains a resource of the LADN PDU session includes: enabling, by the SMF network element, a release timer, and stopping, by the SMF, the data transmission of the LADN PDU session of the LADN, and maintaining, by the SMF network element, the resource of the LADN PDU session before the release timer expires. When the release timer expires, if the SMF finds that the UE is outside the SA of the LADN, the SMF network element triggers to release the LADN PDU session; or if the SMF finds that the UE is inside the SA of the LADN, the SMF network element sets the release timer to 0. When the UE is in the idle state, not only the SMF network element enables the release timer, but also the UE side enables a release timer. When the release timer expires, if the UE is still outside the SA of the LADN, the UE releases a resource for the LADN PDU session that is on the UE, and the SMF network element releases a resource for the LADN PDU session that is on a network element of a core network.

This application is described below by using three different embodiments as examples. Embodiment 1: When the UE is in the connected state and the LADN PDU session is in the activation state, the LADN PDU session is processed by using the type-1 policy, the type-2 policy, the type-3 policy, or the type-4 policy. Embodiment 2: When the UE is in the connected state and the LADN PDU session is in the deactivation state, the LADN PDU session is processed by using the type-2 policy, the type-3 policy, or the type-4 policy. Embodiment 3: The LADN PDU session is processed in a specific manner when the UE is in the IDLE state.

Figure 4:
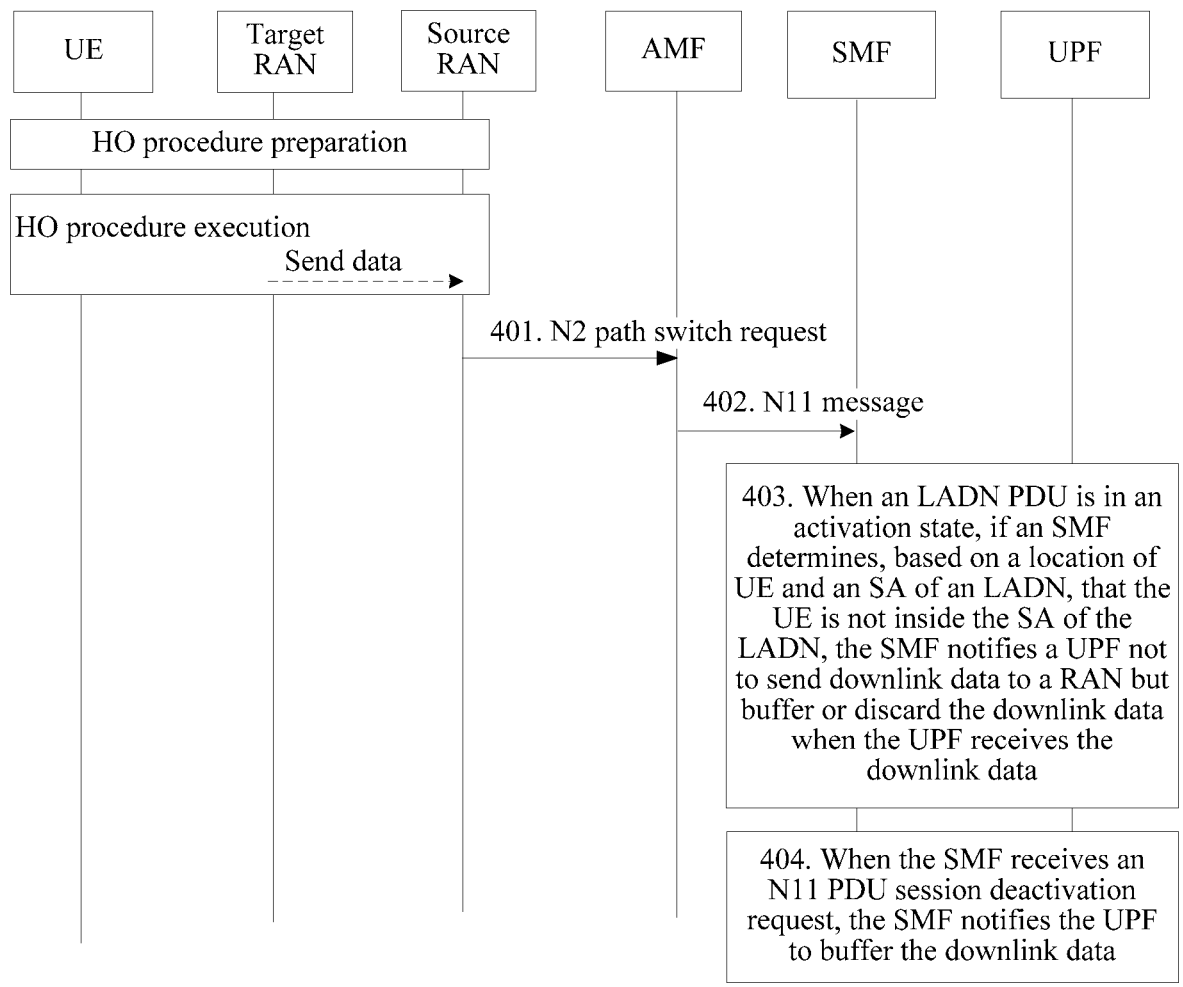
FIG. 4 is a schematic flowchart of interaction between a plurality of network elements of a session management method in a handover procedure according to an embodiment of this application.

First, referring to the following Embodiment 1:

As shown in FIG. 4, this embodiment describes a case in which when the LADN PDU session is the activation state, the UE moves and is handed over, and the LADN PDU session is processed in an HO procedure. FIG. 4 is a schematic flowchart of interaction between a plurality of network elements of a session management method in a handover procedure according to an embodiment of this application. A specific procedure includes the following steps.

401. UE moves and is handed over to a target RAN, and the target RAN sends, to an AMF, a path switching request (N2 Path Switch Request) carrying a list of sessions that need to be switched.

402. The AMF sends an N11 message to an SMF corresponding to the list, where the N11 message carries tunnel information of the target RAN side and location information of the UE. The tunnel information is included in N2 session management (SM) information. For example, the tunnel information of the target RAN side may include an IP address of the RAN and a tunnel endpoint identifier of the RAN side (RAN TEID).

For a session that is not included in the foregoing list, for example, a session that fails to be switched or a session in a deactivation state, the AMF also sends the N11 message to a corresponding SMF to notify the SMF of a session switching failure or location update.

In some embodiments of this application, the SMF may further subscribe to the location information of the UE from the AMF. Therefore, when the AMF finds that the location of the UE changes, the AMF sends, to the SMF, the N11 message carrying the location of the UE, to notify the SMF of the location information of the UE.

403. The SMF processes an LADN PDU session based on the location of the UE, an SA of an LADN, and a status of the LADN PDU session. There are the following several specific processing cases:

(1) When the LADN PDU session is in an activation state and the UE is inside the SA of the LADN, the SMF performs the following HO procedure of the UE. Specifically, the following several steps are included:

Step 1. The SMF sends, to a UPF, a user plane path modification request carrying the tunnel information of the target RAN, to update the tunnel information of the RAN side that is stored in the UPF.

Step 2. The UPF returns a user plane path modification response.

Step 3. The SMF returns an N11 message acknowledgement (N11 message ACK) to the AMF.

Step 4. The AMF sends a path switching request response to the target RAN.

Step 5. The target RAN sends a resource release indication to a source RAN.

(2) When the LADN PDU session is in the activation state and the UE is not inside the SA of the LADN, the SMF processes the LADN PDU session based on a policy. A processing manner varies with different policy types:

(a) Type-1 policy

The SMF pauses data transmission of the LADN PDU session, in other words, maintains a RAN resource and a UPF resource, and when receiving downlink data, the UPF may buffer or discard the downlink data.

A specific implementation may be as follows:

Step 1. The SMF sends a notification message to the UPF, to notify the UPF not to send the downlink data to the RAN but buffer or discard the downlink data when the UPF receives the downlink data.

Step 2. Optionally, the UPF returns a notification response.

(b) Type-2 policy

The SMF triggers the LADN PDU session to enter a first state, in other words, releases a RAN resource and maintains a UPF resource, and when the UPF receives downlink data, the UPF may buffer or discard the downlink data.

A specific implementation may be as follows:

Step 1. The SMF sends a notification message to the UPF, to notify the UPF to buffer or discard the downlink data when the UPF receives the downlink data.

Step 2. Optionally, the UPF returns a notification response.

Step 3. The SMF sends a release command to the RAN via the AMF, to request the RAN to release a radio resource.

Step 4. After receiving the release command, the RAN triggers to release a wireless connection between the RAN and the UE.

Step 5. The RAN returns release complete to the SMF via the AMF.

When receiving the downlink data of the LADN PDU session, the UPF performs the following step.

Step 1. The UPF buffers or discards the downlink data.

(c) Type-3 policy

The SMF triggers the LADN PDU session to enter a second state, in other words, releases a RAN resource and maintains a UPF resource, the UPF sends a downlink data notification to the SMF when receiving downlink data, and the SMF does not trigger the session to enter the activation state.

A specific implementation may be as follows:

Step 1. The SMF sends a release command to the RAN via the AMF, to request the RAN to release a radio resource.

Step 2. After receiving the release command, the RAN triggers to release a wireless connection between the RAN and the UE.

Step 3. The RAN returns release complete to the SMF via the AMF.

When receiving the downlink data of the LADN PDU session, the UPF performs the following steps.

Step 1. The UPF sends, to the SMF, a downlink data notification message carrying a session ID.

Step 2. When receiving the downlink data notification, the SMF does not trigger the LADN PDU session to enter the activation state, in other words, maintains the deactivation state of the LADN PDU session.

(d) Type-4 policy

The SMF triggers to release the LADN PDU session, in other words, releases a RAN resource, releases a UPF resource, and releases an SMF resource.

A specific implementation may be as follows:

Step 1. The SMF sends, to the UPF, a session release request (N4 session Release Request) carrying an N4 session ID, to request the UPF to release a session resource corresponding to the N4 session ID.

Step 2. The UPF returns a session release response.

Step 3. The SMF sends a release command to the RAN via the AMF, to request the RAN to release a radio resource.

Step 4. After receiving the release command, the RAN triggers to release a wireless connection between the RAN and the UE.

Step 5. The RAN returns release complete to the SMF via the AMF.

It should be noted that the foregoing step 3 to step 5 may be replaced with the following step: When the RAN needs to send uplink data to the UPF, because the UPF cannot process the uplink data, the UPF returns error information, and the RAN releases a session resource on the RAN in response to the error information.

It should be noted that when the LADN PDU session is processed by using the type-1 policy, the SMF may stop processing the LADN PDU session by using the type-1 policy. Specifically, there may be the following two implementation cases:

Case 1. When the UE moves into the SA of the LADN, the SMF stops the type-1 policy processing on the LADN PDU session. Specific steps are as follows:

Step 1. The UE (continues to) move and be handed over to the target RAN, and the target RAN sends the path switching request to the AMF.

Step 2. When determining, based on the location of the UE and the SA of the LADN, that the UE is inside the SA of the LADN, the SMF stops the type-1 policy processing on the LADN PDU session, to restore a data transmission process of the LADN PDU session.

Case 2: When the LADN PDU session enters the deactivation state, the type-1 policy processing on the LADN PDU session is stopped. The SMF determines, based on the location of the UE and the SA of the LADN, whether the UE is inside the SA of the LADN, to determine whether to use the policy.

A reason why the LADN PDU session enters the deactivation state may be that the UE enters an idle state, for example, a UE context release procedure on an AN (UE context release in AN procedure) that is initiated by the RAN or the AMF, or a session deactivation procedure initiated by the UE, the RAN, the SMF, the AMF, or a PCF.

Figure 5:
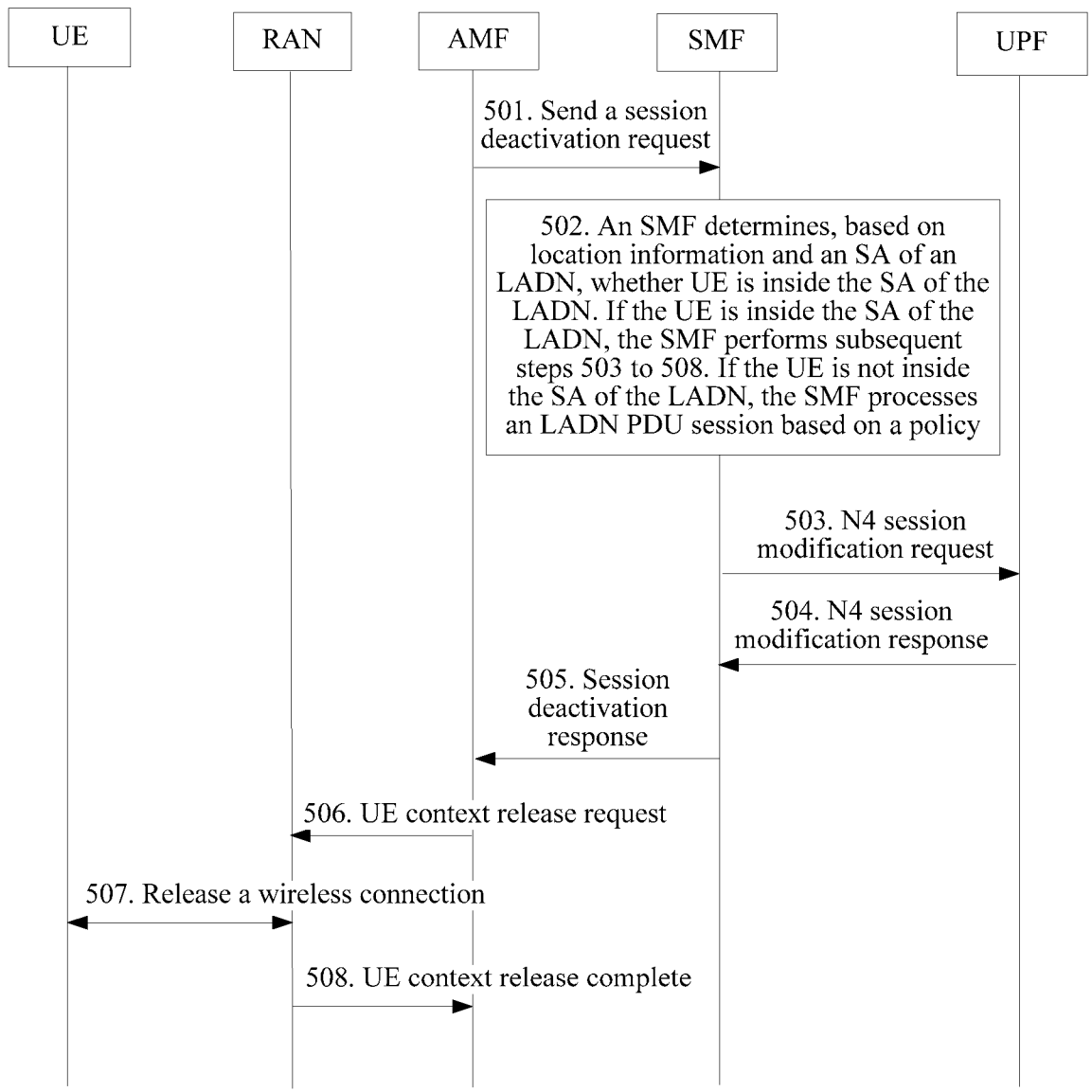
FIG. 5 is a schematic flowchart of interaction between a plurality of network elements in a scenario of releasing a RAN resource according to an embodiment of this application.

Using a UE context release procedure that is on the RAN and that is initiated by the AMF as an example, as shown in FIG. 5, FIG. 5 is a schematic flowchart of interaction between a plurality of network elements in a scenario of releasing a RAN resource according to an embodiment of this application. A specific procedure is described as follows:

501. An AMF sends, to an SMF, a session deactivation request carrying a session ID and location information of UE.

502. The SMF determines, based on the location information of the UE and an SA of an LADN, whether the UE is inside the SA of the LADN.

If the UE is inside the SA of the LADN, the SMF performs subsequent steps 503 to 508.

If the UE is not inside the SA of the LADN, the SMF processes an LADN PDU session based on a policy. For example, the policy is the following type-2 policy, type-3 policy, or type-4 policy.

Type-2 policy: The SMF triggers the LADN PDU session to enter a first state, a session modification request sent by the SMF to a UPF in step 503 is further used to notify the UPF to buffer or discard downlink data of the LADN PDU session when the UPF receives the downlink data.

Type-3 policy: The SMF triggers the LADN PDU session to enter a second state, when the SMF receives a downlink data notification from the UPF, the SMF does not trigger the session to enter an activation state.

Type-4 policy: The SMF triggers to release the LADN PDU session, a session modification request in step 503 should be replaced with a session release request, to trigger the UPF to release a session-related context such as tunnel information of RAN side, the session ID, and QoS corresponding to the session, and a session modification response in step 504 should be replaced with a session release response.

Step 503. The SMF sends a session modification request to a UPF, to trigger the UPF to delete tunnel information of RAN side from the UPF.

Step 504. The UPF returns a session modification response.

Step 505. The SMF sends a session deactivation response to the AMF.

Step 506. The AMF sends a UE context release request to the RAN, to trigger the RAN to initiate UE context release.

Step 507. The RAN initiates release of a wireless connection between the RAN and the UE.

Step 508. The RAN sends UE context release complete to the AMF.

It should be noted that the SMF stores information about the SA of the LADN, and the information about the SA may be sent from the AMF or a PCF to the SMF in a session establishment process. A specific implementation may include but is not limited to the following two manners:

Manner 1: In a session establishment process, the AMF sends the SA of the LADN to the SMF.

Step 1. The UE sends, to the AMF, a session establishment request carrying an LADNN and a session ID.

Step 2. The AMF selects an SMF based on information such as the LADNN and subscription data, forwards the session establishment request to the SMF, and sends an LADN SA parameter to the SMF.

Step 3. The SMF stores the information about the SA of the LADN.

Manner 2: In a session establishment process, that the SMF obtains the information about the SA of the LADN from the PCF may include the following steps.

Step 1. The UE sends, to the AMF, a session establishment request carrying an LADNN and a session ID.

Step 2. The AMF selects an SMF based on information such as the LADNN and subscription data, and forwards the session establishment request to the SMF.

Step 3. The SMF sends the establishment request such as a PDU-CAN session establishment request to the PCF, where the establishment request carries the LADNN.

Step 4. The PCF returns an establishment response such as a PDU-CAN session establishment response to the SMF, where the response carries the SA of the LADN.

The SMF stores the information about the SA of the LADN in the foregoing manner 1 and manner 2.

It can be learned from the foregoing example descriptions of Embodiment 1 that when the UE is in the connected state, the SMF processes the LADN PDU session in the activation state based on the policy, for example, pauses the data transmission of the LADN PDU session, or enables the LADN PDU session to enter the first state, or enables the LADN PDU session to the second state, or releases the session, so that high signaling overheads caused by frequent movement of the UE into and out of the SA of the LADN can be avoided.

Next, referring to the following Embodiment 2:

This embodiment describes manners of processing the LADN PDU session by the SMF in the following three cases when the UE is in the connected state and the LADN PDU session is in the deactivation state: (1) when the LADN PDU session enters the deactivation state, the SMF processes the LADN PDU session by using the policy; (2) when the LADN PDU session is in the deactivation state and the UE moves and is handed over, the SMF processes the LADN PDU session by using the policy in an HO procedure; and (3) when the LAND PDU session is in the deactivation state, if downlink data arrives at the UPF, the SMF processes the LADN PDU session by using the policy.

(1) A procedure in which the LADN PDU session enters the deactivation state

When the LADN PDU session enters the deactivation state, the LADN PDU session stops to be processed by using the type-1 policy. The SMF determines, based on the location of the UE and the SA of the LADN, whether the UE is inside the SA of the LADN, to determine to a type of policy to be used. A reason why the LADN PDU session enters the deactivation state may be that the UE enters the idle state, for example, a UE context release procedure on an AN (UE context release in AN procedure) that is initiated by the RAN or the AMF, or a session deactivation procedure initiated by the UE, the RAN, the SMF, the AMF, or the PCF.

(2) An HO procedure

Figure 6:
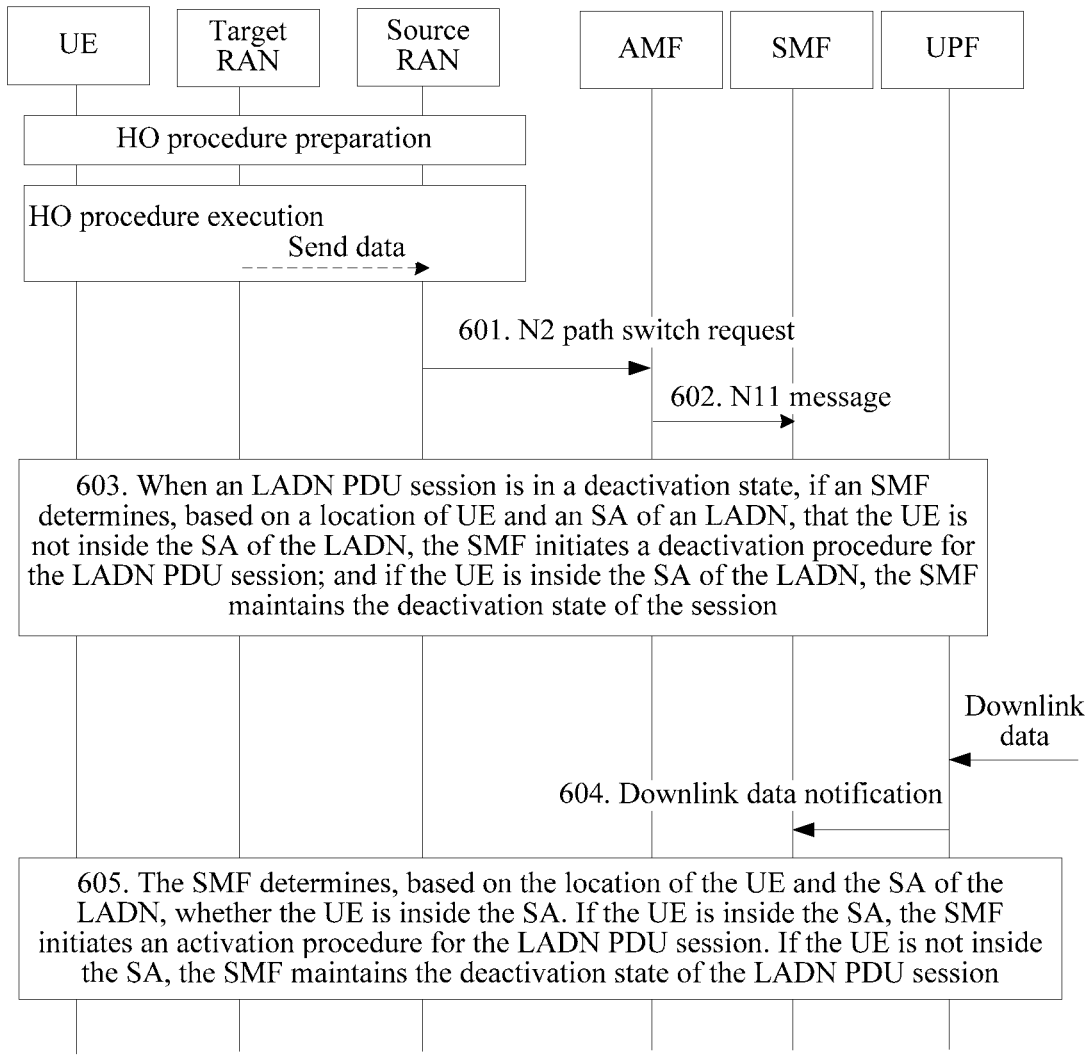
FIG. 6 is a schematic flowchart of another interaction between a plurality of network elements of a session management method in a handover procedure according to an embodiment of this application.

Referring to FIG. 6, FIG. 6 is a schematic flowchart of another interaction between a plurality of network elements of a session management method in a handover procedure according to an embodiment of this application. A specific procedure is described as follows:

601. UE moves and is handed over to a target RAN, and the target RAN sends, to an AMF, a path switching request (N2 Path Switch Request) carrying a list of sessions that need to be switched.

602. The AMF sends an N11 message to an SMF corresponding to the list, where the N11 message carries tunnel information of the target RAN side and location information of the UE. The tunnel information is included in N2 SM information. For example, the tunnel information of the target RAN side may be an IP address of the RAN and a tunnel endpoint identifier of the RAN side (RAN TEID).

For a session that is not in the foregoing list, namely, an LADN PDU session in a deactivation state, the AMF also sends, to an SMF, the N11 message carrying the location information of the UE.

It should be noted that for the session that is not in the foregoing list, namely, the LADN PDU session in the deactivation state, there is another processing manner: The AMF determines, based on the location information of the UE and an SA of an LADN, whether the UE is outside the SA of the LADN. If the UE is outside the SA of the LADN, the AMF sends the N11 message to an SMF corresponding to the LADN PDU session, to notify the SMF to process the LADN PDU session based on a policy.

603. The SMF processes an LADN PDU session based on a location of the UE and an SA of an LADN. Specific processing is as follows:

(1) When the UE is inside the SA of the LADN, the SMF maintains the deactivation state of the LADN PDU session.

(2) When the UE is not inside the SA of the LADN, the SMF processes the LADN PDU session based on the policy. A processing manner varies with different policy types: a type-2 policy, a type-3 policy, and a type-4 policy.

It should be noted that when the LADN PDU session is in the deactivation state, if a UPF receives downlink data of the LADN PDU session, the processing manner is related to a type of the policy used by the SMF for the LADN PDU session when the LADN PDU session enters the deactivation state.

When the type-2 policy is used, the UPF discards or buffers the received downlink data.

When the type-3 policy is used, the UPF sends, to the SMF, a downlink data notification carrying a session ID, and the SMF receives the downlink data notification and does not trigger the session to enter an activation state.

When the type-4 policy is used, the foregoing cases do not exist, in other words, the UPF does not receive downlink data.

When none of the foregoing policies is used, the following steps are performed.

Step 1. The UPF sends, to the SMF, a downlink data notification carrying a session ID.

Step 2. The SMF sends, to the AMF, an N11 message carrying the session ID and tunnel information of the UPF side.

Step 3. The AMF determines that the UE is in a connected state, and the AMF sends, to the RAN, an N2 request message carrying the tunnel information of the UPF side.

Step 4. The RAN initiates a process of establishing a wireless connection between the RAN and the UE.

Step 5. The RAN sends, to the AMF, an N2 request ACK message carrying the tunnel information of the RAN side.

Step 6. The AMF sends, to the SMF, an N11 message carrying the tunnel information of the RAN side.

Step 7. The SMF sends, to the UPF, a user plane path modification request carrying the tunnel information of the RAN side.

Step 8. The UPF returns a user plane path modification response.

Step 9. The SMF returns an N11 message acknowledgement to the AMF.

It can be learned from the foregoing example descriptions of Embodiment 2 that when the UE is in the connected state, and the LADN PDU session enters the deactivation state or when the UE is handed over, the SMF processes the LADN PDU session in the deactivation state based on the policy, for example, enables the LADN PDU session to enter a first state, or enables the LADN PDU session to a second state, or releases the session. In this way, the LADN PDU session can be appropriately processed, so that high signaling overheads caused by frequent movement of the UE into and out of the SA of the LADN can be avoided.

Finally, referring to the following Embodiment 3:

This embodiment describes a manner of processing the LADN PDU session by the SMF when the UE is in the idle state in a paging process triggered by a network side. In other words, when downlink data arrives, the processing manner is implemented to decrease signaling overheads caused by constant paging for the UE.

Figure 7:
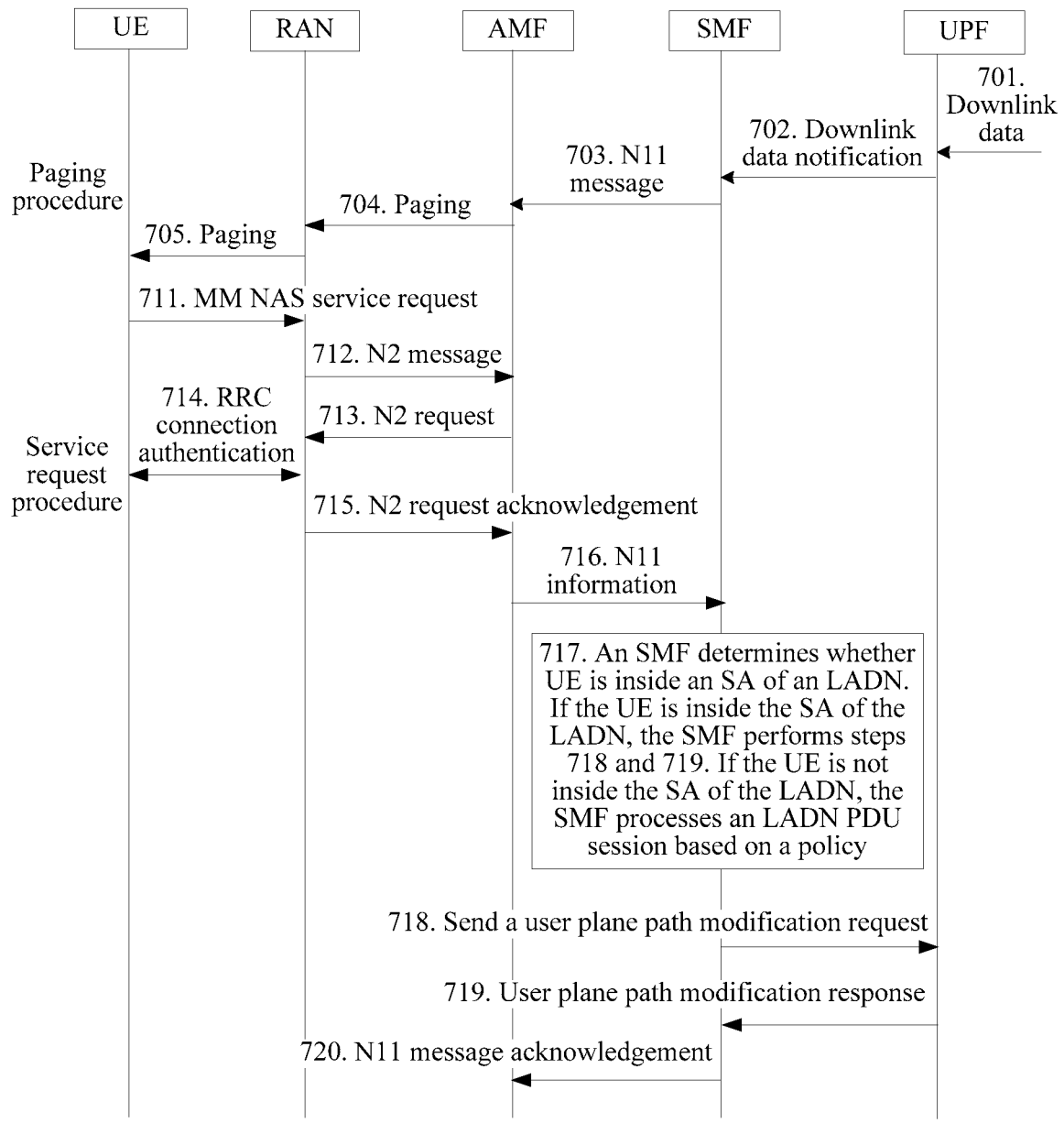
FIG. 7 is a schematic flowchart of interaction between a plurality of network elements of a session management method in a paging procedure according to an embodiment of this application.

Referring to FIG. 7, FIG. 7 is a schematic flowchart of interaction between a plurality of network elements of a session management method in a paging procedure according to an embodiment of this application. The following procedure is specifically included:

A paging procedure:

Step 701. A UPF receives downlink data of an LADN PDU session.

Step 702. The UPF sends, to an SMF, a downlink data notification carrying a session ID.

Step 703. The SMF sends, to an AMF, an N11 message carrying subscriber permanent identifier (SUPI), the session ID, and N2 SM info, where the N2 SM info includes a QoS parameter of the session, tunnel information of the UPF side, and the like.

Step 704. If determining that UE is in an idle state, the AMF triggers a procedure of paging the UE and sends a paging message to a RAN.

Step 705. The RAN sends the paging message to the UE.

A service request procedure:

The paged UE initiates the following service request procedure to respond to the paging procedure.

Step 711. The UE sends, to the RAN, a Radio Resource Control (RRC) message carrying a mobility management (MM) NAS service request.

Step 712. The RAN sends, to the AMF, an N2 message carrying the MM NAS service request and location information of the UE.

Step 713. The AMF sends, to the RAN, an N2 request carrying an MM NAS service accept message and the session ID.

Step 714. The RAN initiates establishment of a wireless connection between the RAN and the UE.

Step 715. The RAN sends, to the AMF, an N2 request acknowledgement (Request ACK) carrying tunnel information of the RAN side and the location information of the UE.

Step 716. The AMF sends, to the SMF, an N11 message carrying the tunnel information of the RAN side and the location information of the UE.

Step 717. The SMF determines, based on the location information of the UE and an SA of an LADN, whether the UE is inside the SA of the LADN. If the UE is inside the SA of the LADN, the SMF performs subsequent steps 718 and 719. If the UE is not inside the SA of the LADN, the SMF processes the LADN PDU session based on a policy. Specifically, the SMF may perform a type-2 policy, a type-3 policy, or a type-4 policy.

Step 718. The SMF sends, to the UPF, a user plane path modification request (N4 Session Modification Request) carrying the tunnel information of the RAN side.

Step 719. The UPF returns a user plane path modification response (N4 Session Modification Response) to the SMF.

Step 720. The SMF returns an N11 message acknowledgement (message ACK) to the AMF.

It should be noted that when the SMF subscribes to, from the AMF, notification information indicating that the UE is outside the SA of the LADN, step 713 to step 720 in the foregoing service request procedure may be replaced with the following implementation: The AMF determines, based on the location information of the UE and the SA of the LADN, whether the UE is outside the SA of the LADN. If the UE is outside the SA of the LADN, the AMF sends the notification information to the SMF, to notify the SMF to process the LADN PDU session based on the policy.

It can be learned from the foregoing example descriptions of Embodiment 3 that when the UE is in the idle state, if the downlink data of the LADN PDU session needs to be sent, signaling overheads caused by constant paging for the UE may be decreased by releasing the LADN PDU session in this application.

It should be noted that, for brief description, the foregoing method embodiments are represented as a series of actions. However, a person skilled in the art should appreciate that this application is not limited to the described order of the actions, because according to this application, some steps may be performed in other orders or simultaneously. It should be further appreciated by a person skilled in the art that the embodiments described in this specification all belong to preferred embodiments, and the actions and modules in the embodiments are not necessarily required by this application.

To better implement the foregoing solutions of the embodiments of this application, the following further provides related apparatuses for implementing the foregoing solutions.

Referring to FIG. 8-a, an embodiment of this application provides an SMF network element 800. The SMF network element 800 may include a condition learning module 801 and a processing module 802.

The condition learning module 801 is configured to learn of whether a first condition is met. The first condition includes: a first location of user equipment UE is outside a service area SA of a local area data network LADN.

The processing module 802 is configured to: when the first condition is met, stop data transmission of an LADN packet data unit PDU session of the LADN, and maintain a resource of the LADN PDU session.

In some other embodiments of this application, the condition learning module 801 is configured to learn of whether a first condition is met. The first condition includes: a first location of user equipment UE is outside a service area SA of a local area data network LADN.

The processing module 802 is configured to: when the first condition is met, based on a policy, stop data transmission of an LADN packet data unit PDU session of the LADN and maintain a resource of the LADN PDU session; or release the LADN PDU session. The policy is associated with at least one of user information of the UE and identification information of the LADN.

In some embodiments of this application, the condition learning module is specifically configured to: obtain the first location of the UE, and determine, based on the first location of the UE, whether the UE is outside the SA of the LADN; or obtain a notification message indicating whether the UE is outside the SA of the LADN, and learn, based on the notification message, of whether the UE is outside the SA of the LADN.

In some embodiments of this application, referring to FIG. 8-b, the SMF network element 800 further includes: a status obtaining module 803, configured to obtain a status of the LADN PDU session.

The first condition further includes: the LADN PDU session is in an activation state.

In some embodiments of this application, the processing module 802 is specifically configured to: notify a user plane function UPF network element to buffer or discard received downlink data; or maintain the status of the LADN PDU session in a deactivation state when the SMF network element receives a downlink data notification from the UPF network element.

In some embodiments of this application, the processing module 802 is specifically configured to: notify the UPF network element to enable a timer and buffer or discard the received downlink data before the timer expires.

The processing module 802 is further configured to: receive a downlink data notification from the UPF network element when the UPF network element receives downlink data after the timer expires; and trigger establishment of a transmission resource of the LADN PDU session in response to the received downlink data notification.

In some embodiments of this application, the processing module 802 is specifically configured to: enable a timer, and notify the UPF network element to buffer or discard the received downlink data when the UPF network element receives the downlink data.

The processing module 802 is further configured to: after the timer expires, notify the UPF network element to send a downlink data notification to the SMF network element when the UPF network element receives downlink data.

In some embodiments of this application, the processing module 802 is specifically configured to: enable a timer, and before the timer expires, maintain the status of the LADN PDU session in the deactivation state when the SMF network element receives the downlink data notification from the UPF network element.

The processing module 802 is further configured to: after the timer expires, trigger establishment of a transmission resource of the LADN PDU session when receiving the downlink data notification from the UPF network element.

In some embodiments of this application, the processing module 802 is specifically configured to: maintain a radio access network RAN resource and a UPF network element resource for the LADN PDU session; or release a RAN resource for the LADN PDU session, and maintain a UPF network element resource for the LADN PDU session; or release a RAN resource and a UPF network element resource for the LADN PDU session, and maintain, by the SMF network element, an SMF network element resource for the LADN PDU session.

Further, in some embodiments of this application, the processing module 802 is specifically configured to: notify, via an AMF network element, a RAN to release the RAN resource; or notify the UPF network element to release the UPF network element resource, so that when the RAN sends uplink data to the UPF network element, the UPF network element returns error information to the RAN, and the RAN releases the RAN resource based on the error information.

In some embodiments of this application, the condition learning module 801 is further configured to learn of whether a second condition is met. The second condition includes: a second location obtained after the UE moves is inside the SA of the LADN.

The processing module 802 is further configured to: when the second condition is met, restore, by the SMF network element, the data transmission of the LADN PDU session. The second condition includes: the second location of the UE is inside the SA of the LADN.

In some embodiments of this application, referring to FIG. 8-c, the SMF network element 800 further includes: a policy obtaining module 804, configured to obtain the policy from a local policy of the SMF network element; or obtain the policy from a policy control function PCF network element.

In some embodiments of this application, the condition learning module 801 is specifically configured to: when the UE is in an idle state, receive the downlink data notification from the UPF network element, and trigger, based on the downlink data notification, the access and mobility management function AMF network element to page the UE; and when the UE initiates a service request in response to the paging, obtain the first location of the UE from the RAN by using the AMF network element; or subscribe to location information of the UE from the AMF network element, and receive the first location from the AMF network element.

In some embodiments of this application, referring to FIG. 8-d, the SMF network element 800 further includes: an SA information obtaining module 805, configured to obtain information about the SA of the LADN from the PCF network element or the AMF network element.

It should be noted that, content such as information interaction between modules/units of the foregoing apparatus and execution processes is based on a conception the same as that of the method embodiments of this application, and brings technical effects the same as those of the method embodiments of this application. For specific content, refer to the descriptions in the foregoing method embodiments of this application, and details are not described herein again.

An embodiment of this application further provides a computer storage medium. The computer storage medium stores a program, and the program performs some or all of the steps described in the foregoing method embodiments.

Next, another SMF network element provided in an embodiment of this application is described. Referring to FIG. 9, an SMF network element 900 includes:

a receiver 901, a transmitter 902, a processor 903, and a memory 904 (there may be one or more processors 903 in the SMF network element 900, and an example in which there is one processor is used in FIG. 9). In some embodiments of this application, the receiver 901, the transmitter 902, the processor 903, and the memory 904 may be connected by using a bus or in another manner. An example in which the receiver 901, the transmitter 902, the processor 903, and the memory 904 are connected by using the bus is used in FIG. 9.

The memory 904 may include a read-only memory and a random access memory, and provide an instruction and data for the processor 903. A part of the memory 904 may further include a non-volatile random access memory (NVRAM). The memory 904 stores an operating system and an operation instruction, an executable module or a data structure, a subset thereof, or an extended set thereof. The operation instruction may include various operation instructions to implement various operations. The operating system may include various system programs to implement various basic services and process a hardware-based task.

The processor 903 controls an operation of the SMF network element. The processor 903 may also be referred to as a central processing unit (CPU). In a specific application, all components of the SMF network element are coupled together by using a bus system. In addition to a data bus, the bus system may further include a power source bus, a control bus, a state signal bus, and the like. However, for clear description, various types of buses in the figure are marked as the bus system.

The method disclosed in the foregoing embodiments of this application may be applied to the processor 903, or may be implemented by the processor 903. The processor 903 may be an integrated circuit chip and has a signal processing capability. In an implementation process, steps in the foregoing methods can be completed by using an integrated logical circuit of hardware in the processor 903, or by using instructions in a software form. The processor 903 may be a general purpose processor, a digital signal processor (DSP), an application-specific integrated circuit (ASIC), a field-programmable gate array (FPGA) or another programmable logical device, a discrete gate or transistor logic device, or a discrete hardware component. The processor 903 may implement or perform the methods, the steps, and logical block diagrams that are disclosed in the embodiments of this application. The general purpose processor may be a microprocessor or the processor may be any conventional processor, or the like. Steps of the methods disclosed with reference to the embodiments of this application may be directly performed and completed by using a hardware decoding processor, or may be performed and completed by using a combination of hardware and a software module in the decoding processor. The software module may be located in a mature storage medium in the art, such as a random access memory, a flash memory, a read-only memory, a programmable read-only memory, an electrically erasable programmable memory, a register, or the like. The storage medium is in the memory 904, and the processor 903 reads information in the memory 904 and completes the steps in the foregoing methods in combination with hardware of the processor.

In this embodiment of this application, the processor 903 is configured to perform the steps in the foregoing method embodiments.

In addition, it should be noted that the described apparatus embodiment is merely an example. The units described as separate parts may or may not be physically separate, and parts displayed as units may or may not be physical units, may be located in one position, or may be distributed on a plurality of network units. Some or all the modules may be selected according to actual needs to achieve the objectives of the solutions of the embodiments. In addition, in the accompanying drawings of the apparatus embodiments provided in this application, connection relationships between modules indicate that the modules have communication connections with each other, which may be specifically implemented as one or more communications buses or signal cables. A person of ordinary skill in the art may understand and implement the embodiments of the present disclosure without creative efforts.

Based on the description of the foregoing implementations, a person skilled in the art may clearly understand that this application may be implemented by using software in addition to necessary universal hardware, or by using dedicated hardware, including a dedicated integrated circuit, a dedicated CPU, a dedicated memory, a dedicated component, and the like. Generally, any functions that can be performed by a computer program can be easily implemented by using corresponding hardware. Moreover, a specific hardware structure used to implement a same function may be in various forms, for example, in a form of an analog circuit, a digital circuit, a dedicated circuit, or the like. However, for this application, software program implementation is a better implementation in most cases. Based on such an understanding, the technical solutions of this application essentially or the part contributing to the prior art may be implemented in a form of a software product. The software product is stored in a readable storage medium, such as a floppy disk, a USB flash drive, a removable hard disk, a read-only memory (ROM), a random access memory (RAM), a magnetic disk, or an optical disc of a computer, and includes several instructions for instructing a computer device (which may be a personal computer, a server, a network device, and the like) to perform the methods described in the embodiments of this application.

All or some of the foregoing embodiments may be implemented by using software, hardware, firmware, or any combination thereof. When the embodiments are implemented by using the software, the embodiments may be completely or partially implemented in a form of a computer program product.

The computer program product includes one or more computer instructions. When the computer program instructions are loaded and executed on the computer, the procedure or functions according to the embodiments of this application are all or partially generated. The computer may be a general purpose computer, a dedicated computer, a computer network, or another programmable apparatus. The computer instruction may be stored in a computer-readable storage medium or may be transmitted from a computer-readable storage medium to another computer-readable storage medium. For example, the computer instruction may be transmitted from a website, computer, server, or data center to another website, computer, server, or data center in a wired (such as a coaxial cable, an optical fiber, or a digital subscriber line (DSL)) or wireless (such as infrared, radio, or microwave) manner. The computer-readable storage medium may be any usable medium that can be stored in a computer, or a data storage device, such as a server or a data center, integrating one or more usable media. The usable medium may be a magnetic medium (such as a soft disk, a hard disk, or a magnetic tape), an optical medium (such as a DVD), a semiconductor medium (such as a solid state disk Solid State Disk (SSD)), or the like.

What is claimed is:

1. A method for supporting a local area data network (LADN), comprising:
   determining, by a session management function (SMF) network element, whether a first condition is met, wherein the first condition comprises: a first location of a user equipment (UE) is outside a service area (SA) of a LADN;
   in response to determining that the first condition is met, determining, by the SMF network element, a first policy from a plurality of policies based on an LADN name and user information;
   notifying, by the SMF network element, an user plane function (UPF) network element to enable a timer;
   stopping, by the SMF network element, data transmission of an LADN packet data unit (PDU) session of the LADN based on the first policy, wherein stopping the data transmission of the LADN PDU session comprises notifying the user plane function (UPF) network element to buffer or discard downlink data received before the timer expires; and maintaining, by the SMF network element based on the first policy, a resource of the LADN PDU session before the timer expires;

receiving, by the UPF network element, downlink data after the timer expires;

in response to receiving the downlink data after the timer expires, sending, by the UPF network element, a downlink data notification to the SMF network element; and when the timer expires and in response to receiving the downlink data notification from the UPF network element, triggering, by the SMF network element, the LADN PDU session to enter an activation state, wherein a duration of the timer is less than a duration of periodic location update received from an access and mobility management function (AMF) network element.

2. The method according to claim 1, wherein determining whether the first condition is met comprises:

obtaining, from the access and mobility management function (AMF) network element, a notification message indicating whether the UE is outside the SA of the LADN, and determining, based on the notification message, whether the UE is outside the SA of the LADN.

3. The method according to claim 1, wherein the method further comprises:

after the timer expires, notifying the UPF network element to send the downlink data notification to the SMF network element in response to that the UPF network element receives the downlink data.

4. The method according to claim 1, wherein the method further comprises:

obtaining a status of the LADN PDU session.

5. The method according to claim 1, wherein the method further comprises:

determining whether a second condition is met, wherein the second condition comprises: a second location obtained after the UE moves is inside the SA of the LADN; and in response to determining that the second condition is met, restoring the data transmission of the LADN PDU session.

6. The method according to claim 1, wherein the method further comprises:

obtaining information about the SA of the LADN from a policy control function (PCF) network element or the AMF network element.

7. A system for supporting a local area data network (LADN), comprising:

a session management function (SMF) network element, configured to:

determine whether a first condition is met, wherein the first condition comprises: a first location of a user equipment (UE) is outside a service area (SA) of a LADN;

in response to determining that the first condition is met, determine a first policy from a plurality of policies based on a LADN name and user information;

notify an user plane function (UPF) network element to enable a timer;

stop data transmission of an LADN packet data unit (PDU) session of the LADN based on the first policy; and maintain a resource of the LADN PDU session based on the first policy before the timer expires; and the user plane function (UPF) network element, configured to:

receive downlink data after the timer expires; and in response to receiving the downlink data after the timer expires, send a downlink data notification to the SMF network element, and wherein the SMF network element is further configured to, when the timer expires and in response to receiving the downlink data notification from the UPF network element, trigger the LADN PDU session to enter an activation state, wherein a duration of the timer is less than a duration of periodic location update received from an access and mobility management function (AMF) network element.

8. The system according to claim 7, wherein to determine whether the first condition is met, the SMF network element is configured to obtain, from the access and mobility management function (AMF) network element, a notification message indicating whether the UE is outside the SA of the LADN, and determine, based on the notification message, whether the UE is outside the SA of the LADN.

9. The system according to claim 7, wherein to stop the data transmission of the LADN PDU session, the SMF network element is configured to notify the UPF network element to buffer or discard downlink data received before the timer expires.

10. An apparatus for supporting a local area data network (LADN), comprising:

at least one processor coupled with one or more memories that store programming instructions for execution by the at least one processor to:

determine whether a first condition is met, wherein the first condition comprises: a first location of a user equipment (UE) is outside a service area (SA) of a LADN;

in response to determining that the first condition is met, determine a first policy from a plurality of policies based on a LADN name and user information;

notify an user plane function (UPF) network element to enable a timer;

stop data transmission of an LADN packet data unit (PDU) session of the LADN based on the first policy, wherein stopping the data transmission of the LADN PDU session comprises notifying the user plane function (UPF) network element to buffer or discard downlink data received before the timer expires;

maintain a resource of the LADN PDU session based on the first policy before the timer expires;

when the timer expires and in response to receiving a downlink data notification from the UPF network element, trigger the LADN PDU session to enter an activation state, wherein a duration of the timer is less than a duration of periodic location update received from an access and mobility management function (AMF) network element.

11. The apparatus according to claim 10, wherein determining whether the first condition is met comprises:
  obtaining, from the access and mobility management function (AMF) network element, a notification message indicating whether the UE is outside the SA of the LADN, and determining, based on the notification message, whether the UE is outside the SA of the LADN.

12. The apparatus according to claim 10, wherein the at least one processor is coupled with one or more memories that store the programming instructions for execution by the at least one processor to:
  after the timer expires, notify the UPF network element to send the downlink data notification to the apparatus in response to that the UPF network element receives the downlink data.

13. The apparatus according to claim 10, wherein the at least one processor is coupled with one or more memories that store the programming instructions for execution by the at least one processor to:
  obtain a status of the LADN PDU session.

14. The apparatus according to claim 10, wherein the at least one processor is coupled with one or more memories that store the programming instructions for execution by the at least one processor to:
  determine whether a second condition is met, wherein the second condition comprises: a second location obtained after the UE moves is inside the SA of the LADN; and
  in response to determining that the second condition is met, restore the data transmission of the LADN PDU session.

15. The apparatus according to claim 10, wherein the at least one processor is coupled with one or more memories that store the programming instructions for execution by the at least one processor to:
  obtain information about the SA of the LADN from a policy control function (PCF) network element or the AMF network element.

* * * * *